US008186598B2

(12) United States Patent
Faenza, Jr.

(10) Patent No.: US 8,186,598 B2
(45) **Date of Patent: *May 29, 2012**

(54) TRANSACTION CARD

(75) Inventor: William J. Faenza, Jr., Andreas, PA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,193

(22) Filed: Sep. 23, 2011

(65) Prior Publication Data

US 2012/0006902 A1 Jan. 12, 2012

Related U.S. Application Data

(63) Continuation of application No. 12/124,937, filed on May 21, 2008, now Pat. No. 8,066,190, which is a continuation-in-part of application No. 11/879,468, filed on Jul. 17, 2007, now Pat. No. 7,837,116.

(51) Int. Cl.
*G06K 19/00* (2006.01)

(52) U.S. Cl. ......................... 235/487; 235/488; 235/491

(58) Field of Classification Search .................. 235/487, 235/488, 491

See application file for complete search history.

(56) References Cited

U.S. PATENT DOCUMENTS

| | | | | |
|---|---|---|---|---|
| 7,837,116 | B2 * | 11/2010 | Morrill et al. | 235/487 |
| 8,066,190 | B2 * | 11/2011 | Faenza, Jr. | 235/487 |
| 2011/0031316 | A1 * | 2/2011 | Morrill-Webb et al. | 235/488 |

OTHER PUBLICATIONS

USPTO; All Office Actions (Non-Final, Final, Advisory Actions, Restrictions/Elections, etc.), Notices of Allowance, 892s, 1449s and SB/08As from U.S. Appl. Nos. 12/062,489; 12/418,510; 12/907,303; 11/879,468; 12/907,358; 12/124,937.

* cited by examiner

*Primary Examiner* — Daniel Hess
(74) *Attorney, Agent, or Firm* — Snell & Wilmer L.L.P.

(57) ABSTRACT

The present invention relates to a process for producing a transparent or translucent transaction card having multiple features. An optically recognizable compound may be associated with a portion of the card for blocking infrared radiation and may comprise an infrared ink having nanocrystalline indium tin oxide particles. Moreover, a portion of the transaction card may include a second optically recognizable compound disposed thereon. The second optically recognizable compound may comprise an infrared phthalocyanine dye, an infrared phosphor, and a quantum dot energy transfer compound. The infrared ink may be detected by a sensor found in an ATM or card assembly line.

16 Claims, 35 Drawing Sheets

TECHNOLOGY CENTER 2800

| Number | Material | Specifications | Source | Comments |
|---|---|---|---|---|
| Construction 1 - white needs work, lamination temperature too low, pvc core bond low. | | | | |
| 1 | pvc laminate | 1.60 | oberthur | front 4.1,4.4; back 4.0,4.0 |
| 2 | pet adhesive both sides | 2.50 | allied signal | |
| 3 | printed core - white #1 | 12.00 | oberthur | |
| 4 | printed core - white #1 | 12.00 | oberthur | |
| 5 | wl-35 pvc (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030-.031 |
| Construction 2 | | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | wl-35 pvc (adh to pet) | 2.00 | klockner | |
| Total | | 34.80 | | |
| Construction 3 | | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | gomar pvc (adh to pet) | 2.00 | allied signal | |
| Total | | 34.80 | | |
| Construction 4 - white #2 too dark, temperature too low, pvc lamination bond low | | | | |
| 1 | pvc laminate | 1.60 | oberthur | front - 4.0, 4.3; back tear |
| 2 | pet adhesive both sides | 2.50 | allied signal | |
| 3 | printed core - white #2 | 12.00 | oberthur | |
| 4 | printed core - white #2 | 12.00 | oberthur | |
| 5 | bemis (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030 - .031 |
| Construction 5 - white #3 too dark, temperature too low - pvc lamination bond low | | | | |
| 1 | pvc laminate | 1.60 | oberthur | |
| 2 | pet adhesive both sides | 2.50 | allied signal | |
| 3 | printed core - white #3 | 12.00 | oberthur | |
| 4 | printed core - white #3 | 12.00 | oberthur | |
| 5 | w-35 (adh to xir pet) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030 - .031 |
| howard 1.0 coating | | | | |
| 1 | neocryl b725 | 33.60 | zeneca? | |
| 2 | EtOH | 31.20 | | |
| 3 | nPOAc | 31.20 | | |

FIG. 11

| | | | |
|---|---|---|---|
| 4 citraflex a4 | 4.00 | moreslip, greensboro | |
| Total | 100.00 | | |
| Construction #6 - seems to stick ok, best so far, scale up. Make sub-laminat (aka - s) | | | |
| 1 pvc laminate | 1.60 | oberthur | |
| 2 core pvc | 12.00 | oberthur | |
| 3 bemis | 2.00 | bemis | |
| 4 petgs | 1.70 | d & k | |
| 5 xir (metal to pet gs) | 1.00 | southwall | plasma treated |
| 6 bemis | 2.00 | bemis | |
| 7 core pvc | 12.00 | oberthur | |
| 8 pvc laminate | 1.60 | oberthur | magnetics |
| Total | 33.90 | | |
| herslow sublamination | | | |
| Total Price | | | |
| Construction #7 - seems to stick ok, best so far, scale up. Make sub-laminat (aka - t) | | | |
| 1 pvc laminate | 1.60 | oberthur | |
| 2 core pvc | 12.00 | oberthur | |
| 3 w-35 | 2.00 | bemis | |
| 4 petgs | 1.70 | d & k | |
| 5 xir (metal to pet gs) | 1.00 | southwall | plasma treated |
| 6 bemis | 2.00 | bemis | |
| 7 core pvc | 12.00 | oberthur | |
| 8 pvc laminate | 1.60 | oberthur | magnetics |
| Total | 33.90 | | |
| Construction #7 - seems to stick ok, best so far, scale up. Make sub-laminat (aka - t) | | | |
| 1 pvc laminate | 1.60 | oberthur | |
| 2 core pvc | 12.00 | oberthur | |
| 3 w-35 | 2.00 | bemis | |
| 4 petgs | 1.70 | d & k | |
| 5 xir (metal to pet gs) | 1.00 | southwall | plasma treated |
| 6 w-35 | 2.00 | bemis | |
| 7 core pvc | 12.00 | oberthur | core to core = 14.2 lb.in. |
| 8 pvc laminate | 1.60 | oberthur | magnetics |
| Total | 33.90 | | |
| Construction #8 - sublaminate to be used with 12 mil pvc core | | | |
| 1 w-35 | 2.00 | | |
| 2 petgs | 1.70 | | |
| 3 xir (metal to pet gs) | 1.00 | | |
| Total | 4.70 | | |
| Construction #9 - sublaminate to be used with 10 mil pvc core | | | |
| 1 pvc laminate | 1.60 | | |
| 2 w-35 | 2.00 | | |
| 3 petgs | 1.70 | | |
| 4 xir (metal to pet gs) | 1.00 | | |
| 5 bemis | 2.00 | | |
| 6 pvc laminate | 1.60 | | |
| Total | 9.90 | | |
| Construction #10 (if u works) | | | |
| 1 w35 | 2.00 | | |
| 2 petgs | 1.70 | | |
| 3 xir (metal to pet gs) | 1.00 | | |
| 4 w35 | 2.00 | | |

FIG. 11 continued

| | | |
|---|---|---|
| Total | 6.70 | |
| ir ink - printed core | | |
| 1 tm mixing clear | 0.80 | sericol |
| 2 vmca resin | 0.07 | union carbide |
| 3 cyclohexanone | 0.10 | aldrich |
| 4 epolight vii-164 | 0.03 | epolin |
| Total | 1.00 | |
| ir ink #2 | | |
| 1 vinyl vmca resin | 0.55 | union carbide |
| 2 eep solvent | 0.35 | eastman kodak |
| 3 cyclohexanone | 0.05 | aldrich |
| 4 epolight vii-164 | 0.03 | epolin |
| 5 epolight vi-30 | 0.02 | epolin |
| Total | 1.00 | |
| ir ink #3 | | |
| 1 tm mixing clear | 0.90 | sericol |
| 2 cyclohexanone | 0.03 | aldrich |
| 3 epolight vii-164 | 0.03 | epolin |
| 4 epolight vi-30 | 0.02 | epolin |
| 5 epolight 6084 | 0.02 | epolin |
| Total | 1.00 | |

FIG. 13

Green Card Measurements

| Wavelength | Transmission Density | ATM Readability | ISO Compliant |
|---|---|---|---|
| 400 to 470 | 1.5 to 2.4 | Yes | Yes |
| 470 to 640 | 1.3 to 0.9 | Yes | No |
| 640 to 780 | 1.3 to 2.5 | Yes | Yes |
| 780 to 800 | 1.3 to 1.2 | Yes | Borderline |
| 800 to 1000 | 1.3 to 2.6 | Yes | Yes |

FIG. 14

Green RCP ATM Test Results

| ATM Manufacturer | Equipment Type | Notes | Global Platform | Pass/Fail |
|---|---|---|---|---|
| NCR Corporation | 15 NCR ATMs<br>6 Diebold ATMs | Diagnostic and Application tested | Yes | Pass |
| Diebold | 202 and 861 (Universal) Series and Kyoto series (made by Omron) | Diebold require opacity of greater than 1.3 from 700nm plus for acceptance in all Diebold machines | Yes | Pass |
| Fujitsu | 5 ATMs with motorized track, motorized track 2 and dip readers | ATM configuration included card reader firmware for card detection, | Yes (except Japan) | Pass |

FIG. 15

TRANSACTION CARD

CROSS REFERENCE TO RELATED APPLICATIONS

The present application claims priority to and is a continuation of U.S. patent application Ser. No. 12/124,937, filed May 21, 2008 and entitled "Transaction Card." The '937 Application is a continuation-in-part Application of U.S. patent application Ser. No. 11/879,468, entitled "Transaction Card," and filed Jul. 17, 2007. All these applications are incorporated herein by reference.

FIELD OF INVENTION

The present invention relates generally to a transaction card, and more particularly, to the fabrication and use of an infrared blocking transparent or translucent transaction card.

BACKGROUND OF THE INVENTION

The proliferation of transaction cards, which allow the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services without the need to constantly possess cash. If a consumer needs cash, transaction cards also may allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a desire for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to protect against forgery and tampering. Thus, the initial cards merely served as devices to provide data to merchants and the only security associated with the card was the comparison of the cardholder's signature on the card to the cardholder's signature on a receipt, along with the embossed cardholder name on the card. However, many merchants often forget to verify the signature on the receipt with the signature on the card.

Due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As such, many transaction cards included not only demographic and account information, but the transaction cards also include graphic images, designs, photographs and security features. A recent security feature is the incorporation of a diffraction grating, or holographic image, into the transaction card which appears to be three dimensional and which substantially restricts the ability to fraudulently copy or reproduce transaction cards because of the need for extremely complex systems and apparatus for producing holograms. A hologram is produced by interfering two or more beams of light, namely an object beam and reference beam, onto a photoemulsion to thereby record the interference pattern produced by the interfering beams of light. The object beam is a coherent beam reflected from, or transmitted through, the object to be recorded, such as a company logo, globe, character or animal. The reference beam is usually a coherent, collimated light beam with a spherical wave front. After recording the interference pattern, a similar wavelength reference beam is used to produce a holographic image by reconstructing the image from the interference pattern.

However, in typical situations, a similar laser beam is not available to reconstruct the image from the interference pattern on the card. As such, the hologram should be able to be viewed with ordinary, white light. Thus, when a hologram is recorded onto a transaction card, the image to be recorded is placed near the surface of the substrate to allow the resulting hologram to be visible in ordinary, white light. These holograms are known as reflective surface holograms or rainbow holograms. A reflective hologram may be mass-produced on metallic foil and subsequently stamped onto transaction cards. Moreover, the incorporation of holograms onto transaction cards provides a more reliable method of determining the authenticity of the transaction card in ordinary white light, namely by observing if the hologram has the illusion of depth and changing colors.

Administrative and security issues, such as charges, credits, merchant settlement, fraud, reimbursements, etc., have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, calling cards, and supersmart cards have been developed to meet the market demand for expanded features, functionality, and security. In addition to the visual data, the incorporation of a magnetic stripe on the back of a transaction card allows digitized data to be stored in machine readable form. As such, magnetic stripe reader are used in conjunction with magnetic stripe cards to communicate purchase data received from a cash register device online to a host computer along with the transmission of data stored in the magnetic stripe, such as account information and expiration date.

Due to the susceptibility of the magnetic stripe to tampering, the lack of confidentiality of the information within the magnetic stripe and the problems associated with the transmission of data to a host computer, integrated circuits were developed which may be incorporated into transaction cards. These integrated circuit (IC) cards, known as smart cards, proved to be very reliable in a variety of industries due to their advanced security and flexibility for future applications.

As magnetic stripe cards and smart cards developed, the market demanded international standards for the cards. The card's physical dimensions, features and embossing area were standardized under the International Standards Organization ("ISO"), ISO 7810 and ISO 7811. The issuer's identification, the location of particular compounds, coding requirements, and recording techniques were standardized in ISO 7812 and ISO 7813, while chip card standards were established in ISO 7813. For example, ISO 7811 defines the standards for the magnetic stripe which is a 0.5 inch stripe located either in the front or rear surface of the card which is divided into three longitudinal parallel tracks. The first and second tracks hold read-only information with room for 79 alpha numeric characters and 40 numeric characters, respectively. The third track is reserved for financial transactions and includes enciphered versions of the user's personal identification number, country code, currency units, amount authorized per cycle, subsidiary accounts, and restrictions. More information regarding the features and specifications of transaction cards may be found in, for example, *Smart Cards* by Jose Luis Zoreda and Jose Manuel Oton, 1994*; Smart Card Handbook* by W. Rankl and W. Effing, 1997, and the various ISO standards for transaction cards available from ANSI (American National Standards Institute), 11 West 42nd Street, New York, N.Y. 10036, the entire contents of all of these publications are herein incorporated by reference.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices. With respect to ATMs, the total number of ATM devices shipped in 1999 is 179,274 (based on Nilson Reports data) including the ATMs shipped by the top ATM manufacturers, namely NCR (138-18 231st Street, Laurelton, N.Y. 11413), Diebold (5995 Mayfair, N.C., Ohio 44720-8077), Fujitsu (11085 N. Torrey Pines Road, La Jolla, Calif. 92037), Omron (Japan), OKI (Japan) and Triton.

Many of the card acceptance devices require that the transaction card be inserted into the device such that the device may appropriately align its reading head with the relevant component of the transaction card. Particularly, many ATMs require that a transaction card be substantially inserted into a slot in the ATM. After insertion of the card into the slot, the ATM may have an additional mechanical device for further retracting the transaction card into the ATM slot. To activate the ATM, the ATM typically includes a sensor, such as a phototransistor and a light emitting diode (LED), which emits light onto a card surface and the phototransistor receives light from the LED. A card blocks the infrared radiation from the phototransistor, therefore indicating that a card has been detected. A typical LED in an ATM is an IRED (infrared emitting diode) source having a wavelength in the range of about 820-920 nm or 900-1000 nm (see FIG. 5), which is not present in ambient light at the levels needed by a phototransistor sensor. The spectral sensitivity curve of the typical phototransistor is in the range of about 400 nm-1100 nm (see FIG. 6). However, the visible spectrum is about 400 nm-700 nm, and the spectral sensitivity of the phototransistor is about 60% at 950 nm and 90% at 840 nm. Thus, visible light is not part of the analog-to-digital algorithm. Moreover, ISO 7810, clause 8.10 requires that all machine readable cards have an optical transmission density from 450 nm-950 nm, greater than 1.3 (less than 5% transmission) and from 950 nm-1000 nm, greater than 1.1 (less than 7.9% transmission).

Moreover, newer LEDs in ATMs, vending machines, and other machines that utilize card technology may utilize an IRED source having a wavelength much higher than described above. Specifically, it is known that some LEDs have IRED sources having a wavelength up to about 1550 nm, or higher. Heretofore, solutions for blocking or absorbing IRED sources will not block wavelengths higher than about 1000 to 1100 nm.

For the card to be detected by the ATM, the light is typically blocked by the card body. Moreover, the amount of light necessary to be blocked by a card is related to the voltage data received from the analog to digital conversion. The voltage range of the sensor is typically in a range of about 1.5V to 4.5V. When a card is inserted into a sensor, the voltage drops to less than 1.5V indicating the presence of a card in the transport system. After the card is detected by the phototransistor, the magnetic stripe reader scans the magnetic stripe and acquires the information recorded on the magnetic stripe. A manufacturer of the LED sensor device in an ATM is, for example, Omron and Sankyo-Seiki of Japan, 4800 Great America Parkway, Suite 201, Santa Clara, Calif. 95054.

As previously mentioned, transaction cards and readers typically follow various ISO standards which specifically set forth the location of card data and compounds. However, because numerous companies produce different versions of ATMs, the location of the sensor within the ATM is not subject to standardization requirements. In the past, the varying locations of the sensor within the ATM did not affect the ability of the ATM to sense the transaction card because the transaction card included a substantially opaque surface, such that any portion of the opaque transaction card may interrupt the IRED emission and activate the insert phototransistor. However, more recently, to provide a unique image, and to meet consumer demand, companies have attempted to develop transparent or translucent transaction cards. The use of a transparent card would often not activate the insert phototransistor because the IRED emission would not sufficiently reflect off of a transparent surface, so the radiation would simply travel through the card and become detected by the phototransistor. The machine, therefore, could not detect the presence of the card, and often jammed the equipment.

In an attempt to solve this problem, companies have printed opaque areas onto transparent cards in an effort to provide an opaque area to activate the input sensors on ATMs. However, due to the aforementioned variations in the location of the sensor in many ATMs, the use of limited opaque areas on a transparent card did not allow the card to activate the sensor in a sufficient number of ATMs. Alternatively, companies attempted to incorporate a lens onto a transaction card in an effort to redirect the LED light. However, during the card manufacture process, which often involves substantial pressure and heat, the lensing surface would be disrupted or destroyed. As such, a need exists for a transparent or translucent transaction card which is capable of activating an input sensor, wherein the input sensor may interface the card in a variety of locations. Moreover, a need exists for a transparent or translucent transaction card which is capable of activating an input sensor, wherein the input sensor may utilized an LED having an IRED source of relatively high wavelengths, such as around 1550 nm or higher.

Furthermore, during the card fabrication process, the cards are typically detected on the assembly line in order to accurately count the number of cards produced during a predetermined time interval. To count the cards, typical card fabrication assembly lines include counters with LED sensors, similar to the ATM sensors, which count the cards based upon the reflection of the LED light beam off of the opaque card surface. The production of transparent transaction cards suffers from similar limitations as ATM devices in that the LED beam does not reflect or is not sufficiently absorbed from a transparent surface. Thus, a transparent card is needed that may be produced on existing assembly lines. Similar problems exist when cards are punched to final dimensions.

Although existing systems may allow for the identification and detection of articles, most contain a number of drawbacks. For example, identification features based on UV, visible light detection, etc. are sometimes difficult to view, often require certain lighting requirements and typically depend on the distance between the article and the detection device. Additionally, the use of certain types of plastic, paper or other material which contain the identification mark may be limited by the particular identification device. For example, opaque materials typically deactivate the phototransistors in ATM's by blocking light in both the visible (near IR) and far IR light regions. Furthermore, the incorporation of a detection or authentication feature into a card product requires a separate material or process step during the card fabrication process. The incorporation of a new material or process step often requires expensive modifications to current equipment or new equipment and often extends the time for fabricating the card product.

BRIEF SUMMARY OF THE INVENTION

The present invention relates to a process for producing a transparent or translucent transaction card having any one or more features, such as a holographic foil, integrated circuit chip, silver magnetic stripe with text on the magnetic stripe, opacity gradient, an infrared blocking ink or film contained within the construction of the card, a translucent signature field such that the signature on back of the card is visible from the front of the card and an "active thru" date on the front of the card. The card is infrared blocking due to an invisible or transparent infrared ink or film which is distributed over the card's surface, thereby allowing the card to block (absorb, refract, diffuse and/or reflect) infrared light and transmit all other light. Particularly, when the transaction card is inserted into an ATM device, the light beam from the IRED is blocked by the infrared ink or film, thereby deactivating the phototransistor. Moreover, during the manufacturer of transaction cards, the infrared blocking card allows an IRED light beam from a personalization device, inspection unit or counter device to count the number of transaction cards produced in an assembly line.

The present invention further relates to an ink or film contained within the construction of a transaction card having a material that blocks an LED IRED source having relatively high wavelengths. More specifically, the material blocks an LED IRED source having a wavelength of about 1400 nm and above. The material may block an LED IRED source having a wavelength of about 1550 nm and above.

Still further, the present invention relates to an ink or film contained within the construction of a transaction card having a material that blocks an LED IRED source having both relatively low and relatively high wavelengths. More specifically, the material may block an LED IRED source having a wavelength range between about 770 nm and above. More specifically, the material may block an LED IRED source having a wavelength range between about 820 nm and about 2000 nm. The material may block an LED IRED source having a wavelength range between about 900 nm and about 1600 nm.

BRIEF DESCRIPTION OF THE DRAWINGS

A more complete understanding of the present invention may be derived by referring to the detailed description and claims when considered in connection with the following illustrative figures, which may not be to scale. In the following figures, like reference numbers or steps refer to similar compounds throughout the figures.

FIG. 11 shows exemplary embodiments of layers for card construction in accordance with an exemplary embodiment of the present invention;

FIG. 13 shows exemplary IR ink ingredients which exhibit a green color in accordance with an exemplary embodiment of the present invention;

FIG. 14 shows measurements related to these exemplary green cards in accordance with an exemplary embodiment of the present invention;

FIG. 15 shows exemplary ATM test results for the exemplary green cards in accordance with an exemplary embodiment of the present invention;

DETAILED DESCRIPTION

Figure 1:
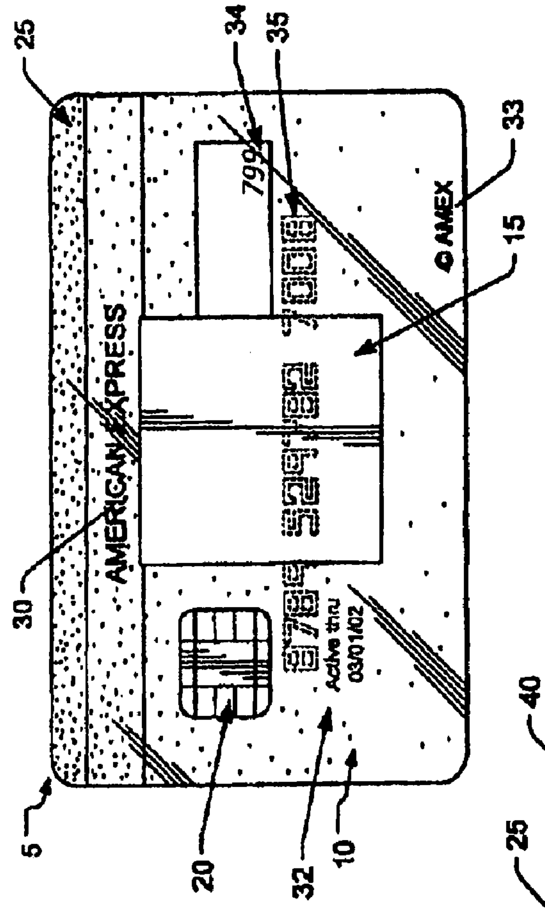
FIG. 1 is a front view of an exemplary transaction card in accordance with an exemplary embodiment of the present invention.

The detailed description of exemplary embodiments herein makes reference to the accompanying drawings and pictures, which show exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In general, the present invention allows for the identification and detection of various articles, wherein the articles include materials having optically and machine recognizable compounds. The articles include, for example, transaction cards, documents, papers and/or the like. The materials include, for example, coatings, films, threads, plastics, inks, fibers, paper, planchettes, and/or the like.

In an exemplary embodiment, the optically and machine recognizable compounds are infrared blocking compounds containing infrared blocking (absorbing, refracting, diffusing, reflecting or otherwise blocking) components. Blocking, as used herein includes absorbing, refracting, diffusing, reflecting or otherwise altering the path. The infrared blocking compounds may be invisible, visible, or colored to produce a desired effect and/or they may contain other detectable compounds, such as, for example, UV-Fluorescent or IR-Fluorescent features. The infrared blocking compounds may have good stability, resistance properties, durability and other physical properties, such as good appearance, flexibility, hardness, solvent resistance, water resistance, corrosion resistance and exterior stability. Moreover, the use of such compounds typically does not interfere with UV compounds that may be present in many substrates. One skilled in the art will appreciate that an infrared blocking compounds may be any chemical, solution, dye, ink, substrate, material and/or the like which is recognizable by an optical sensor. In various embodiments, an infrared blocking ink includes an infrared ink which blocks, absorbs and/or reflects most infrared light, but transmits most other wavelengths of light. In various embodiments, an infrared blocking ink includes an infrared ink which blocks, absorbs and/or reflects most infrared light, but transmits most other wavelengths of light. In various embodiments, various infrared blocking compounds are used in combination to achieve enhanced blocking capability. Enhanced blocking capability may be the ability to block a wide range of wavelengths. Enhanced blocking capability may be the capability to block a range of wavelengths with various mechanisms.

In an exemplary embodiment, the infrared blocking compound is incorporated into a material in the form of a film, plastic, fiber, ink, concentrate, thermoplastic or thermoset matrix, thread, planchette, and/or other medium which contains in the range of about 0.001 to 40.0 wt. (%) of a compound derived from organic or inorganic materials. The infrared ink may be applied to card 5 (see FIG. 1) by, for example, a screen printing process or any other printing or coating means such as lithography, gravure, flexo, calender coating, curtain coating, roller coating and/or the like. An exemplary screen printing process utilizes a screen press equipped with drying equipment (UV curable or convection heat) and a screen with a specific mesh size of about 80 lines/cm. The IR ink is printed across any portion of the entire card surface of plastic using a silk screen press, as described below.

Because the relative eye sensitivity of an ordinary observer for a specified level of illumination is between around 400-770 nm, infrared ink at over 770 nm is invisible to the human eye in normal white light. As such, the invisible infrared material will not substantially obscure the transparent surface of card 5. Additionally, the exemplary ink withstands card production temperatures of about 200 F to 400 F degrees and includes a "light fastness period" (which is the resistance of the ink to fade or degrade in the presence of any light, and specifically, UV light) of about at least three years under normal credit card usage conditions. Moreover, the exemplary ink blocks, absorbs or reflects the spectral output of IRED's, such as, for example, the Sankyo Seiki LED's, which is about 800-1000 nm. The exemplary ink also limits the light reaching the phototransistors, so the presence of a clear card having the ink is detected in a transaction machine, such as, for example, a card grabbing-type ATM machine.

Exemplary compositions of the infrared blocking compounds of the present invention comprise a mixture of a wide variety of compounds. The active compounds are derived of inorganic, organometallic, or organic layered materials or rare earth compounds, most commonly rare earth oxides, oxysulfides or oxyhalides. The compounds are relatively inert, so the effects on the performance properties of the final product are minimized. The infrared blocking compound comprises either a dye, layered material, pigment and/or encapsulated pigment that is dispersed in a particular medium which may be incorporated into a wide variety of end-usable products. The particle size of the infrared blocking compound allows the materials (plastic, thread, ink, etc.) to optimally be dispersed or dissolved and uniformly exist within the articles which it is incorporated.

Conventionally known infrared blocking materials comprising layered dielectric and metallic materials or doped rare-earth materials may be effectively used as pigments for compounds in accordance with exemplary embodiments of the present invention. In this context, the pigments or dyes absorb specific wavelengths of energy and may change one wavelength of energy to another. The energy conversions or absorptions may be above or below any stimulation within the electromagnetic spectrum. The infrared blocking compounds may absorb specific wavelengths of light or change from one color to another or the compounds may change from invisible to visible and/or the like. The infrared blocking compounds of the present invention are thus incorporated into a system which reversibly changes one wavelength of energy to another, hence causing a "fingerprint"—type of detectable feature within the articles. Various glues and/or binders may also have the ability to block infrared radiation, among other types of radiation. However, the infrared blocking ability of a glue or binder is typically in a wavelength range higher than 9000 nm. Many of the infrared blocking compounds discussed herein below have the ability to block infrared light in the range of about 800 nm to 6000 nm and higher. Infrared blocking materials that block from about 800 nm to 2000 nm and those that block from about 1000 nm to 1600 nm are especially useful in various applications.

Moreover, the prepared films or materials may be mixed with a binder to form infrared compounds for use in threads, fibers, coatings, and the like. Binders that may be incorporated in the present invention include conventional additives such as waxes, thermoplastic resins, thermoset resins, rubbers, natural resins or synthetic resins. Such examples of such binders are, polypropylene, nylon, polyester, ethylene-vinyl acetate copolymer, polyvinyl acetate, polyethylene, chlorinated rubber, acrylic, epoxy, butadiene-nitrile, shellac, zein, cellulose, polyurethane, polyvinylbutyrate, vinyl chloride, silicone, polyvinyl alcohol, polyvinyl methyl ether, nitrocellulose, polyamide, bismaleimide, polyimide, epoxy-polyester hybrid and/or the like. Films that may be used include polyester, polyvinylchloride, polypropylene, polyethylene, acrylic, polycarbonate and/or the like. As discussed below, any film may be laminated or adhered to common card articles using heat, adhesives, or a combination of both.

If the content of the compound is too low, adequate blocking may not be achieved and the phototransistor may not send the proper signal to the capture device, which will mean that the card will not be detected. Therefore, the infrared compounds are usually present in the composition at a total amount from about 1 ppm to 80.0 wt. (%), and possibly from about 0.25%-25.0% by weight. Moreover, the present invention contemplates that other materials such as, for example, UV absorbers, reflectors, antioxidants, and/or optical brighteners, may be added in order to achieve better resistance properties, aesthetics, or longevity of the materials.

Particularly, other materials may be added to allow for color shifts from one color to another color after stimulation. Commonly employed materials such as dyes, pigments, fluorescent dyes, luminous pigments, and/or the like, may be used to promote reversible color changes from one color state to another color state. Such materials may be incorporated directly with the infrared compounds during initial processing or may be added after the infrared compounds have been processed. The use of materials such as solvents, water, glycols, and/or the like may be added to adjust rheological properties of the material. Also, the use of surfactants, defoamers, release agents, adhesion promoters, leveling agents, and/or the like may be added to the formulations for improved processing properties. Optical brightening materials may also be added to ensure whiteness in a colorless state and to maintain a low level of contrast between many substrates where infrared compounds are located.

In an embodiment of the present invention, an IR-blocking and/or absorbing ink may be printed onto one or more layers of a financial transaction card. The ink may comprise a combination of a pure, recrystallized infrared phthalocyanine dye, an inorganic infrared phosphor, and a quantum dot energy transfer-based compounds. These materials may be combined together and printed on one or more layers of a transaction card. These materials may also be combined with various types of plastic and incorporated into a transaction card. Plastic containing these materials may be formed into layers. The combination of materials, coupled with separation of layers using printing methods, allows infrared radiation absorption to occur, and energy transfer to occur between the infrared phthalocyanine dye, the phosphor, and the quantum dot compound. The absorption of infrared radiation, reflection and/or emission is typically transferred from one molecule to another, thereby resulting in energy transference from one molecule to another, resulting in specific infrared radiation becoming absorbed, trapped and, ultimately, blocked from passing through a transaction card.

Without being limited by theory, it is believed that non-radiative energy transfer of excitation energy occurs between energy donor and energy acceptor. In this case, it is believed that energy absorbed by the phthalocyanine dye is trapped by the inorganic infrared phosphor and the quantum dot material. Therefore, visible radiation emitted by the phosphor is quenched by the quantum dot material. Moreover, separate printing of multiple layers of the ink described herein, in combination with various thermoplastic substrates, provides birefringement properties as well due to differences in refractive indices, further increasing the IR-blocking and absorbing capability of a financial transaction card described herein.

Such non-classical transfer of energy, as described above, is typically explained in terms of the concept of an "exciplex," an excited complex of two or more molecules arising when an excited molecule comes in contact with a non-excited molecule. However, it is noted that in the present invention, it appears that exciplex formation occurs even when the electronic spectra of donor and acceptor are separate. It is believed that after photo excitation via infrared radiation having a wavelength between about 800 nm to about 1000 nm and greater, the donor collides with the acceptor and an electron transfer to free orbit of the acceptor takes place. An electron is then transferred from this orbit to the ground (non-excited) state of the donor, which is not then accompanied by emission of a photonic quantum. The process is amplified by the materials that are used being removed from solution by the printing process' solvent evaporation and resin bonding to the ink binder. This process provides a much more rigid absorption of infrared radiation. A proper binder is selected to allow the materials to resin bond after printing and further bond during the lamination process.

The pure, recrystallized phthalocyanine dyes of the present invention may include phthalocyanines having the ability to absorb infrared radiation, such as between about 700 nm and about 1000 nm. These phthalocyanine dyes include antimony core complexes, although other core metal complexes may be utilized, such as nickel, platinum, palladium, or any other metal atom that contributes to the phthalocyanine's infrared radiation absorbing capability. Moreover, phthalocyanine dyes including halogen functional groups may be utilized. Fluoride may be used as a halogen functional group, however, any other halogen may be utilized that is apparent to one having ordinary skill in the art. The phthalocyanine dyes may be chosen to provide a broad range of infrared absorption. An antimony core fluoride phthalocyanine dye may be used for the present invention.

One or more phthalocyanine dyes having infrared absorption peaks at 850 nm and 1000 nm may be utilized. A combination of two or more phthalocyanine dyes may be used. Moreover, the phthalocyanine dyes of the present invention may be present in an amount between about 0.0001 wt. % and about 1 wt. %, either alone or in combination. Exemplary phthalocyanine dyes may be obtained from Indigo Science, Newark, N.J., and include Indigo 5547a phthalocyanine dye having an absorption peak of 850 nm, and Indigo 1000a phthalocyanine dye having an absorption peak of 1000 nm.

The inorganic infrared phosphors utilized in the present invention may be based on Y, Yb, Ho, Gd and Er-doped rare earth oxide compounds. Phosphors may include $Gd_2O_3$, $Er_2O_3$, $Y_2O_3$, $YF_3$, either alone or in combination. The phosphors may be utilized singly, or in combination, and may be present in an amount between about 0.01 wt. % and about 5 wt. %.

The quantum dot energy transfer-based compounds may include quantum dot material having from about C9 to about C27 ligands and may be present, either singly or in combination in an amount between about 0.0002 wt. % and about 7.0 wt. %.

The materials described above may be combined together with binders, resins, catalysts, and other compounds useful for creating an ink from the materials. Solvent may be utilized, including 2-ethoxy-ethyl propionate, ethyl acetate, n-propyl acetate, ethyl alcohol, n-propanol, methyl ethyl ketone. The solvent may be present in an amount between about 5 wt. % and about 60 wt. %. Resins useful for the present invention include VMCH, VMCA, polyamide, polyester, linseed alkyl resins and acrylic, and may be present in an amount between about 8 wt. % and about 35 wt. %. A silane-type catalyst may be used to help bond the phthalocyanine dye to the resin. Specifically, the silane-type catalyst may be used to ring-open the phthalocyanine dye molecule and help the molecule bind to the resin, such as, for example, acrylic. A silane-type catalyst include 3-amino-propyl triethoxy silane, although the present invention should not be limited, as stated herein. The silane-type catalyst may be present in an amount between about 0.005 wt. % and about 2.00 wt. %. The silane-type catalyst may be present at about 500 ppm.

The materials described above are combined together and printed to one or more layers of a financial transaction card via gravure, screen and lithographic variations. FIG. 7J illustrates a cross-section of a financial transaction card according to the invention described herein. The inks of the present invention are placed on one or more sides of polyvinyl chloride and laminated together with magnetic stripes, printed and/or non-printed core layers, and overlaminate layers. The present invention may allow for the easy production of IR-blocking and/or absorbing financial transaction cards without adhesives and/or subassemblies.

After placing the layers of the financial transaction card together in registration (or some variation thereof that is apparent to one having ordinary skill in the art), the layers are laminated in a stack lamination unit for approximately 13 minutes at about 300° F. to about 310° F. under pressure and then cooled for an additional 13 minutes at about 50° F. to about 60° F. The resulting card is approximately 30 mils and possesses good durability and sufficiently blocks infrared light from between about 800 nm to 1200 nm with an optical density of greater than 1.3.

The printing method is typically chosen based on the composition of the various formulations outlined above. Various printing methods may include gravure, silkscreen and lithographic processes, although ink-jet, roll-coating and flexographic methods may be utilized as well. The inks and/or substrates of the present embodiment and their placement and thickness may vary to accommodate different types of core substrates and thicknesses thereof. In addition, PVC may be utilized as a printable substrate. However, other substrates such as PETG, polycarbonate and PET may be utilized provided there are at least slight differences in refractive index between the ink and the substrate.

Infrared phthalocyanine dye or dyes, infrared phosphors and/or quantum dot materials may be incorporated into various plastics such as PVC, PETG, polycarbonate and PET.

Examples of inks of the present invention described above with reference to combinations of infrared phthalocyanine dye or dyes, infrared phosphors and quantum dot materials are described in Examples 5-10, below.

In another embodiment of the present invention, a method has been developed to modify nanocrystalline indium tin oxide ($In_2O_3.SnO_2$) molecules ("ITO particles" or "ITO molecules") to be highly transparent, yet reflect infrared light. This material effectively blocks infrared radiation having relatively high wavelengths, as illustrated in FIG. 17J. The modified nanocrystalline ITO molecules may block IR radiation, when incorporated into an ink, coating or other material for disposing on and/or incorporating into a transaction card, at wavelengths as low as about 900 nm and increasing above about 1200 nm, as shown in FIG. 17J. The nanocrystalline ITO molecules may block IR radiation from between about 1300 nm and about 2500 nm. The nanocrystalline ITO molecules may also block IR radiation from between about 1400 nm and about 2000 nm. The nanocrystalline ITO particles may block IR radiation at about 1550 nm. Nanocrystalline ITO particles are typically between 5-100 nm with a specific surface area of 25-50 $m^2/g$. Nanocrystalline ITO particles may be in a ratio of 50% $In_2O_3$ to 50% $SnO_2$. Nanocrystalline ITO particles may further be in a ratio of 90% $In_2O_3$ to 10% $SnO_2$. Nanocrystalline ITO particles may still further be in a ratio of 70% $In_2O_3$ to 30% $SnO_2$.

Transaction cards and other articles may be produced using modified nanocrystalline ITO molecules in an ink, coating, or other material that may be printed, coated, or otherwise disposed on or incorporated into a transaction card or other article. Moreover, any ink, coating or other material utilizing modified nanocrystalline ITO molecules may be combined with various inks, coatings, and/or other materials described herein to provide a transaction card or other article having an IR-blocking or absorbing ability that spans a large section of the IR spectrum. Specifically, inks, coatings and/or other materials described herein may be utilized to block or absorb IR-radiation above about 750 nm. The inks, coatings and/or other materials of the present invention may be utilized to block or absorb IR radiation between about 800 nm and about 2500 nm. The inks, coating and/or other materials of the present invention may be utilized to block or absorb IR radiation between about 900 nm and about 2000 nm.

The nanocrystalline ITO molecules in an ink, coating, or other material may be applied to one or more layers of a transaction card, as fully described herein. The inks, coatings and/or other materials described herein may be applied by printing said inks, coatings or other materials to one or more layers. An internal layer may be printed on, such as prior to laminating said layers to other layers to form a transaction card. In various embodiments, one or more inks, coatings and/or other materials containing nanocrystalline ITO particles described herein may be incorporated into a layer. A layer may be made of a plastic material. For example, nanocrystalline ITO particles may be incorporated into a layer of polycarbonate.

Nanocrystalline ITO particles may be synthesized by a coprecipitation method in an aqueous solution and a thermal method in an alcohol solution. Specifically, the starting materials may be purchased from Samsung Corning Corporation, Warriewood NSW 2102, Australia. Non-nanocrystalline ITO may be dissolved in an acidic solution of pH of about 5. For example, oxalic acid may be used. A doping agent may be used to dope the ITO particles. Suitable doping agents include Period 4 transition metals. Cobalt may be added to dope the ITO. A liquid extraction may be performed to transfer ITO into an organic solvent phase. A slow, drop-wise precipitation technique may be used to precipitate or coprecipitate nanocrystalline ITO particles. In a thermal method, the nanoparticles have a two phase crystal structure of indium oxide hydroxide (InOOH) and indium hydroxide (In(OH)3).

The crystal structure of ITO may be revealed via X-ray diffraction. Nanocrystalline ITO particles may be annealed. Annealing may occur at about 100 degrees C. to 350 degrees C. Annealing may occur at a temperature of about 300 degrees C. Annealing may occur in an atmosphere containing oxygen ($O_2$). When annealing at a temperature of about 300 degrees C., the Nanocrystalline ITO particle structure may be a rhombohedral crystal structure or a tetrahedral crystal structure.

Nanocrystalline ITO particles may also be purchased commercially. For example, nanocrystalline ITO particles are commercially available from American Elements, 1093 Broxton Ave. Suite 2000, Los Angeles, Calif. 90024, USA, Air Products and Chemicals, Inc., 7201 Hamilton Boulevard, Allentown, Pa. 18195-1501, USA, and Sigma-Aldrich, 3050 Spruce St., St. Louis, Mo. 63103, USA.

Near IR-reflective film may be prepared by mechanical dispersion in a horizontal media mill in a vinyl polymer, VMCA, provided by Union Carbide. Transmission electron microscopy ("TEM") and energy dispersive X-ray spectrometer ("EDS") may be used to characterize the morphology and composition of ITO particles. Near-IR ("NIR") spectrometry may be used to determine the reflectance on the surface of film made with the ITO particles in the NIR-radiation region, as shown in FIG. 17J. Particle size may be determined to be 70 to 90 nm via a Beckman-Coulter particle size analysis model LS 320.

To make a dispersion of the nanocrystalline ITO particles, about 15%-25.0% by weight nanocrystalline ITO particles may be dissolved in 75%-85% by weight solvent. About 20% nanocrystalline ITO particles may be dissolved in 80% solvent. About 5% nanocrystalline ITO particles may be dispersed in 95% solvent. A 40% by weight nanocrystalline ITO particles may be dispersed in about 60% by weight n-propyl acetate. Solvents useful to disperse the nanocrystalline ITO particles include polar, non-polar, hydrophobic, and/or hydrophillic solvents such as n-propanol, ethanol, methyl-ethyl ketone, cyclohexanone, ethyl acetate, water, n-propyl acetate, dimethyl sulfoxide, acetone and most other organic solvents. Liquid and polymer dispersions containing about 25% nanocrystalline ITO, 65% solvent and about 10% polymer from any polymers described herein for various inks may be prepared as well.

Various ink formulations may be made with the nanocrystalline ITO particle dispersion of the present invention, such as for screen printing, lithographic printing, Gravure printing and Flexo printing. Each ink formulation may be specifically tailored for the particular printing method. For example, for screen printing, the nanocrystalline ITO dispersion may be further dispersed in cyclohexane. Moreover, for litho printing, the nanocrystalline ITO dispersion may be further dispersed in Lawter 100s free flow alkyd. In addition, for Gravure printing, nanocrystalline ITO dispersion may be dispersed in VMCA and n-propyl acetate. Finally, for Flexo printing, nanocrystalline ITO dispersion may be dispersed in n-propyl alcohol. While specific solvents are presented, depending on the method of printing or fabricating onto or into one or more layers of a transaction card, it should be recognized by those having ordinary skill in the art that the nanocrystalline ITO dispersion may be dispersed in a plurality of solvents. See below for examples of nanocrystalline ITO dispersions of the present invention for various printing methods.

Various primer formulations may be made with nanocrystalline ITO particles. A primer includes a material that is applied prior to an adhesive that improves and/or alters the bonding characteristics of the adhesive. Many primers alter surface tension characteristics in order to improve the bonding characteristics of the adhesive. A primer includes gravure ink containing nanocrystalline ITO particles that is printed on a substrate layer, prior to application of an adhesive. Any suitable primer may include nanocrystalline ITO particles.

In a further embodiment of the present invention, fibers of various materials are used either in a continuous manner or single fibers may be incorporated into a wide variety of materials. The present invention contemplates, for example, natural fibers, synthetic fibers, copolymer fibers, chemical fibers, metal fibers, and/or the like. Examples of these fibers may be nylon, polyester, cotton, wool, silk, casein fiber, protein fiber, acetalyated staple, ethyl cellulose, polyvinylidene chloride, polyurethane, acetate, polyvinyl alcohol, triacetate, glass, wood, rock wool, carbon, inorganic fibers, and/or the like. Such fibers may be incorporated or mixed into other types of materials such as paper pulp, plastic label stock, plastic materials, and the like. Such materials may be used alone in a continuous manner or may be used as mono- or di-filaments in other materials.

Moreover, the infrared blocking compounds that are incorporated into plastics may be used with a wide variety of materials, such as, for example, nylon, acrylic, epoxy, polyester, bismaleimide, polyamide, polyimide, styrene, silicone, vinyl, ABS, polycarbonate, nitrile, and/or the like. As such, the compounds that are incorporated into fibers, plastics, film and/or the like, may be processed directly to a suitable form in a single- or multi-process application. Such compounds may be added into a formulation in the form of a single ingredient or in the form of a master-batch that is then processed in a similar manner to normal processing operations of compounds. Processing of such compounds includes the use of continuous mixers, two- or three-roll mills, extrusion, and/or other melt-compounding methods of dispersion. While in an exemplary embodiment, the thread may be woven or non-woven, the infrared materials may be extruded directly into a thermoplastic matrix and drawn directly into the form of a thread that may be used in a continuous manner or sectioned in the form of a fiber or plastic film.

The exemplary infrared compounds are deposited onto films of various compositions and may be used in most card applications. Moreover, the infrared compounds in accordance with the present invention may be used alone or blended with other materials at ranges from 0.001 to 50.0 parts by weight, but may be from 1.0 to 15.0 parts by weight.

An infrared compound may be a multilayer polymeric film manufactured by 3M Company (Minneapolis, Minn.), and described in U.S. Pat. No. 5,882,774 entitled "Optical Film", U.S. Pat. No. 6,045,894 entitled "Clear to Colored Security Film", and U.S. Pat. No. 6,049,419 entitled "Multilayer Infrared Reflecting Optical Body", each of which is incorporated herein by reference in their entireties. Specifically, the multilayer polymeric film is either a birefringement dielectric multilayer film or an isotropic dielectric multilayer film designed to reflect infrared radiation, i.e., electromagnetic radiation commonly known to have a wavelength longer than visible light, specifically above about 700 nm.

A film utilized in the present invention comprises at least two layers and is a dielectric optical film having alternating layers of a material having a high index of refraction and a material having a low index of refraction. The film may be either birefringement or isotropic and is designed to allow the construction of multilayer stacks for which the Brewster angle is very large or is nonexistent for the polymer layer interfaces. This feature allows for the construction of multilayer mirrors and polarizers whose reflectivity for p-polarized light decreases slowly with angle of incidence, is independent of angle of incidence, or increases with angle of incidence away from the normal. As a result, the multilayer films have high reflectivity over a wide bandwidth.

Specific examples of such films are described in U.S. Ser. No. 08/402,041, filed Mar. 10, 1995, and U.S. Ser. No. 09/006,601 entitled "Modified Copolyesters and Improved Multilayer Reflective Film", filed on Jan. 13, 1998. In addition, U.S. Pat. No. RE 3,034,605 describes films which prevent higher order harmonics that prevent color in the visible region of the spectrum. Other suitable films include the films described in U.S. Pat. No. 5,360,659, which describes a two component film having a six layer alternating repeating unit that suppresses reflections in the visible spectrum (about 380 nm to about 770 nm) while reflecting light in the infrared wavelength region of between about 770 nm to about 2000 nm.

Multilayer polymeric films may include hundreds or thousands of thin layers and may contain as many materials as there are layers in the stack. For ease of manufacturing, multilayer films may have only a few different materials. A multilayer film, as noted above, includes alternating layers of a first polymeric material having a first index of refraction, and a second polymeric material of a second index of refraction that is different from that of the first material. The individual layers are typically on the order of about 0.05 μm to about 0.45 μm thick. The number of individual layers in the optic film may range from about 80 to about 1000 layers, although other numbers are contemplated in the present invention. In addition, the optical film may be as low as about 0.5 mil thick to as high as about 20.0 mils thick.

The multilayer films useful in the present invention may comprise alternating layers of crystalline naphthalene dicarboxylic acid polyester and another selected polymer, such as copolyester or copolycarbonate, wherein each of the layers have a thickness of less than about 0.5 μm. Specifically, polyethylene 2,6-naphthalate (PEN), polybutylene 2,6-naphthalate (PBN), or polyethylene terephthalate (PET) are typically used. Adjacent pairs of layers (one having a high index of refraction and the other a low index) may have a total optical thickness that is ½ of the wavelength of the light desired to be reflected. However, other ratios of the optical thicknesses within the layer pairs may be chosen as is apparent to one having ordinary skill in the art. An optic film may be as low as about 0.5 mil having alternating layers of PET and polymethylmethacrylate (PMMA).

Any other optical film may be utilized in the present invention that effectively absorbs, refracts, diffuses, reflects or otherwise blocks electromagnetic radiation of a range or a plurality of ranges of wavelengths, but transmits electromagnetic radiation of another range or plurality of wavelengths, such as, for example, blocking the transmission of infrared radiation, but transmitting visible radiation, and the present invention should not be limited as herein described. Other suitable optical films may be utilized as apparent to one having ordinary skill in the art.

The present invention will now be illustrated in greater detail with reference to the following examples, comparative examples, test examples and use examples. As disclosed in the examples, tests and graphs herein, the resulting inks sufficiently block IR radiation from phototransistor detection. It is understood that the present invention is not limited thereto. For example, one skilled in the art will appreciate that, in any of the examples, the ink may contain other materials for different optical effects or authentication purposes.

EXAMPLE 1

The present example includes about 2% Epolin VII-164 dye and about 98% Tech Mark Mixing Clear, produced by Sericol, Inc. 980.0 g of Tech Mark solvent evaporative screen ink is mixed on a high-speed disperser. While mixing, 20.0 g of Epolight VII-164 dye is dissolved completely. The resulting ink has a viscosity of about 3.2 Pa·S at 25 C degrees and is printed using a screen process. The screen process includes a 305 polymer screen onto both sides of clear PVC 13.0 mil film.

EXAMPLE 2

The following ink was produced by adding about 15.0 lbs of Epolight VII-164 and about 20.0 lbs of Epolight VI-30 to about 965 lbs. of TM Mixing Clear. The mixture was dispersed for about 40 minutes. The resulting mixture was coated on PVC core plastic using an 80 line/cm polyester screen. The resulting coating exhibited high absorbtivity from 780 nm to 1070 nm with low visible absorption. Card core, magnetic stripe and lamitate were assembled and the entire assembly was placed in Burckle Stack Lamination Unit at a temperature of about 280 F

EXAMPLE 3

A concentrate of about 30.0 g. Epolight VII-172 was blended with about 700.0 g. of polyvinylchloride plastic. The resulting mixture was extruded at about 260 F, air cooled and pelletized. About 1.0 lb of the resulting pellets were combined with about 99.0 lbs of PVC. Klockner Pentaplast provided calendered sheets of approximately 0.013 inches. Cards were fabricated using said sheets. These cards exhibited sufficenent absorption in the IR region from 800 nm to 1000 nm. The cards were detected by a Sankyo ATM capture device.

EXAMPLE 4

Multi-Layer PET plastic with sufficient optical properties was combined into a card construction. The PET plastic was provided by 3M Co. (Minneapolis, Minn.), as described above. The resultant card exhibited sufficient optics such that an ATM device detected the card.

EXAMPLE 5

Ink containing about 37.0 wt. % 2-ethoxy-ethyl-proprionate was combined with about 27.0 wt. % VMCH vinyl resin. The ink further comprised about 0.0015 wt. % of a mixture of about 0.00075 wt. % Indigo 5547a phthalocyanine dye, obtained from Indigo Science, Newark N.J., having an absorption peak of about 850 nm and about 0.0009 wt. % Indigo 1000a phthalocyanine dye, also obtained from Indigo Science, having an absorption peak of about 1000 nm. About 0.00003 wt. % quantum dot material having about C 17 assymetric along the Y-Axis ligands were added. An inorganic phosphor containing Y, Yb, Tm, and Yt oxide about 0.005 wt. % was added. About 500 ppm 3-amino-propyl triethoxy silane was included. The resulting ink was screen printed on a solvent-evaporative screen press on both sides of a PVC substrate and laminated at about 305° F. for 13 minutes.

EXAMPLE 6

Ink having the above concentrations of phthalocyanine dyes, quantum dot material and inorganic phosphors was combined with about 16.0 wt. % vinyl VMCA resin and about 88.0 wt. % methyl ethyl ketone to make an ink for gravure printing. The mixture was printed on both sides of 7.0 mil PVC, and laminated to form a financial transaction card, as described above in Example 5.

EXAMPLE 7

Ink containing the above concentrations of phthalocyanine dyes, quantum dot material and inorganic phosphors were combined and milled with about 22.0 wt. nitro-polyamide resin containing about 18.0 wt. % ethyl acetate, about 14.0 wt. % n-propyl acetate, about 7.0 wt. % ethyl alcohol, about 3.0 wt. % n-propanol and about 19.0 wt. % methyl ethyl ketone solvents. The mixture was gravure printed on both sides of 7.0 mil PVC layer and laminated to form a financial transaction card, as described above in Example 5.

EXAMPLE 8

Ink containing the above concentrations of phthalocyanine dyes, quantum dot material and inorganic phosphors were combined with about 20.0 wt. % acrylic resin and about 34.0 wt. % MEK. The mixture was gravure printed on 7.0 mil PETG and laminated to form a financial transaction card, as described above in Example 5.

EXAMPLE 9

Ink containing the above concentrations of phthalocyanine dyes, quantum dot material and inorganic phosphors was combined with about 98.0 wt. % Serical TM-MX and screen printed on 7.0 mil PVC using a polyester 325-mesh screen.

EXAMPLE 10

Ink containing approximately 10 times the concentration by wt. % of phthalocyanine dyes, quantum dot material and inorganic phosphors was combined in a three roll mill using a mixture of about 18.0 wt. % gelled and free-flow linseed alkyd resins and adjusted to printing viscosity and tack with about 17.0 wt. % deodorized kerosene (Magisol 52). The mixture was lithographically printed on both sides of 10 mil PVC, dried overnight and laminated as described above in Example 5.

EXAMPLE 11

Nanocrystalline ITO particles may be synthesized via a coprecipitation method. Starting materials may be purchased from Samsung Corning Corporation, Warriewood NSW 2102, Australia. Non-nanocrystalline ITO may be dissolved in an aqueous, acidic solution of pH of about 5. For example, oxalic acid or hydrochloric acid may be used. Cobalt may be added to dope the ITO. A liquid extraction may be performed to transfer ITO into an organic solvent phase. Dimethyl sulfoxide (DMSO) may be a suitable organic solvent. A slow, drop-wise precipitation technique may be used to precipitate or coprecipitate nanocrystalline ITO particles.

EXAMPLE 12

A dispersion may be made from the nanocrystalline ITO particles made by Method 11, above. Specifically, about 40% by weight nanocrystalline ITO particles made by Method 11 may be dispersed in about 60% by weight n-propyl acetate.

EXAMPLE 13

An ink formulation may be made from the dispersion made by Method 12 for screen printing onto one or more layers of a transaction card. The ink formulation may be comprised of about 5% by weight of the dispersion of Method 12 dispersed in about 95% by weight cyclohexane.

EXAMPLE 14

An ink formulation may be made from the dispersion made by Method 12 for lithographic printing onto one or more layers of a transaction card. The ink formulation may be comprised of about 40% by weight of the dispersion of Method 12 dispersed in about 60% by weight Lawter 100s free flow alkyd.

EXAMPLE 15

An ink formulation may be made from the dispersion made by Method 12 for Gravure printing onto one or more layers of a transaction card. About 20% by weight VMCA resin may be dissolved in 50% by weight methyl ethyl ketone followed by the addition of about 30% by weight of the dispersion of Method 12. The resulting material may be printed on two sides of PET-G. A spectrum may be measured using a Si—Ge detector with a CVI spectrometer in transmission mode. The spectrum is shown in FIG. 17J.

EXAMPLE 16

An ink formulation may be made from the dispersion made by Method 12 for Flexo printing onto one or more layers of a transaction card. The ink formulation may comprise about 35% by weight of the dispersion of Method 12 dispersed in about 65% by weight n-propyl alcohol.

A preparation of nanocrystalline ITO may be incorporated into a plastic that is then extruded or otherwise processed into a translucent or transparent layer. Nanocrystalline ITO may be incorporated into most plastics, including polycarbonate and PVB. Such a layer may be incorporated into various articles of manufacture, including transaction cards.

A preparation of nanocrystalline ITO may be incorporated into a plastic that is then extruded or otherwise processed into a translucent or transparent layer. An ink formulation using any preparation of nanocrystalline ITO may be disposed onto plastic materials. The resulting plastic may be laminated, associated with or otherwise affixed to layers containing one or more infrared blocking materials. In this manner, by combining multiple infrared blocking materials, the resulting article may be able to successfully block one or more wavelength ranges of infrared light.

An ink formulation using any preparation of nanocrystalline ITO may be incorporated into a plastic that is then extruded or otherwise processed into a translucent or transparent layer. A nanocrystalline ITO layer may be laminated, associated with, or otherwise affixed to a subassembly comprising a birefringement dielectric material, an isotropic dielectric material, a metallic film, or an infrared blocking film comprising a plurality of layers disposed on a substrate where at least two of the layers have different refractive indices. A nanocrystalline ITO layer may be laminated, associated with, or otherwise affixed to a layer containing an infrared blocking ink. A nanocrystalline ITO layer may be laminated, associated with, or otherwise affixed to a layer containing or having a quantum dot compound.

An ink formulation using any preparation of nanocrystalline ITO may be disposed onto a substrate layer. A layer having nanocrystalline ITO ink may be laminated, associated with, or otherwise affixed to a subassembly comprising a birefringement dielectric material, an isotropic dielectric material, a metallic material, or an infrared blocking film comprising a plurality of layers disposed on a substrate where at least two of the layers have different refractive indices. A layer having nanocrystalline ITO ink may be laminated, associated with, or otherwise affixed to a birefringement dielectric material, an isotropic dielectric material, a metallic material, and/or an infrared blocking film comprising a plurality of layers disposed on a substrate where at least two of the layers have different refractive indices. A layer having nanocrystalline ITO ink may be laminated, associated with, or otherwise affixed to a layer containing an infrared blocking ink. A layer having nanocrystalline ITO ink may be laminated, associated with, or otherwise affixed to a layer containing or having a quantum dot compound.

ADDITIONAL EXAMPLES

Figure 16:
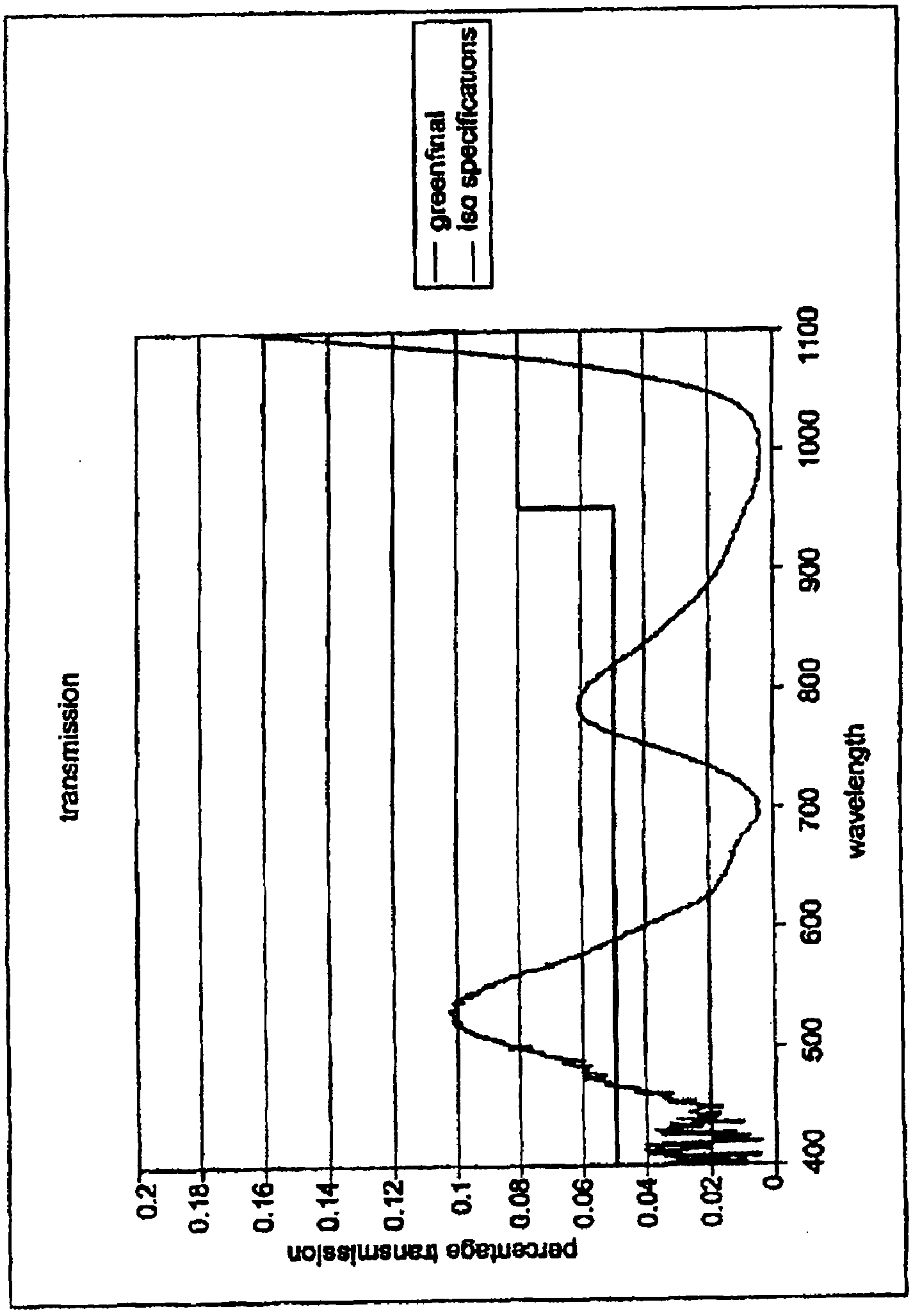
FIG. 16 shows an example of the transmission density of exemplary green cards in a graph of percent transmission v. wavelength in accordance with an exemplary embodiment of the present invention; and, FIGS. 17A-17J show exemplary test results for various card embodiments in a graph of percent transmission v. wavelength (nm) in accordance with an exemplary embodiment of the present invention.

Additional examples of IR ink formulations are disclosed in FIG. 13. The IR ink examples in FIG. 13 exhibit a visible green color. Moreover, FIG. 14 shows measurements related to these exemplary cards, including, for certain wavelength ranges, transmission density, ATM readability and ISO compliance. FIG. 15 shows exemplary test results for the exemplary green cards wherein samples of the cards were inserted into ATMs of various manufacturers. The tests resulted in positive ATM detection of the exemplary cards. Furthermore, FIG. 16 shows an example of the transmission density of exemplary green cards in a graph of percent transmission v. wavelength (the graph also indicates the ISO specifications for the card).

Figure 17A:
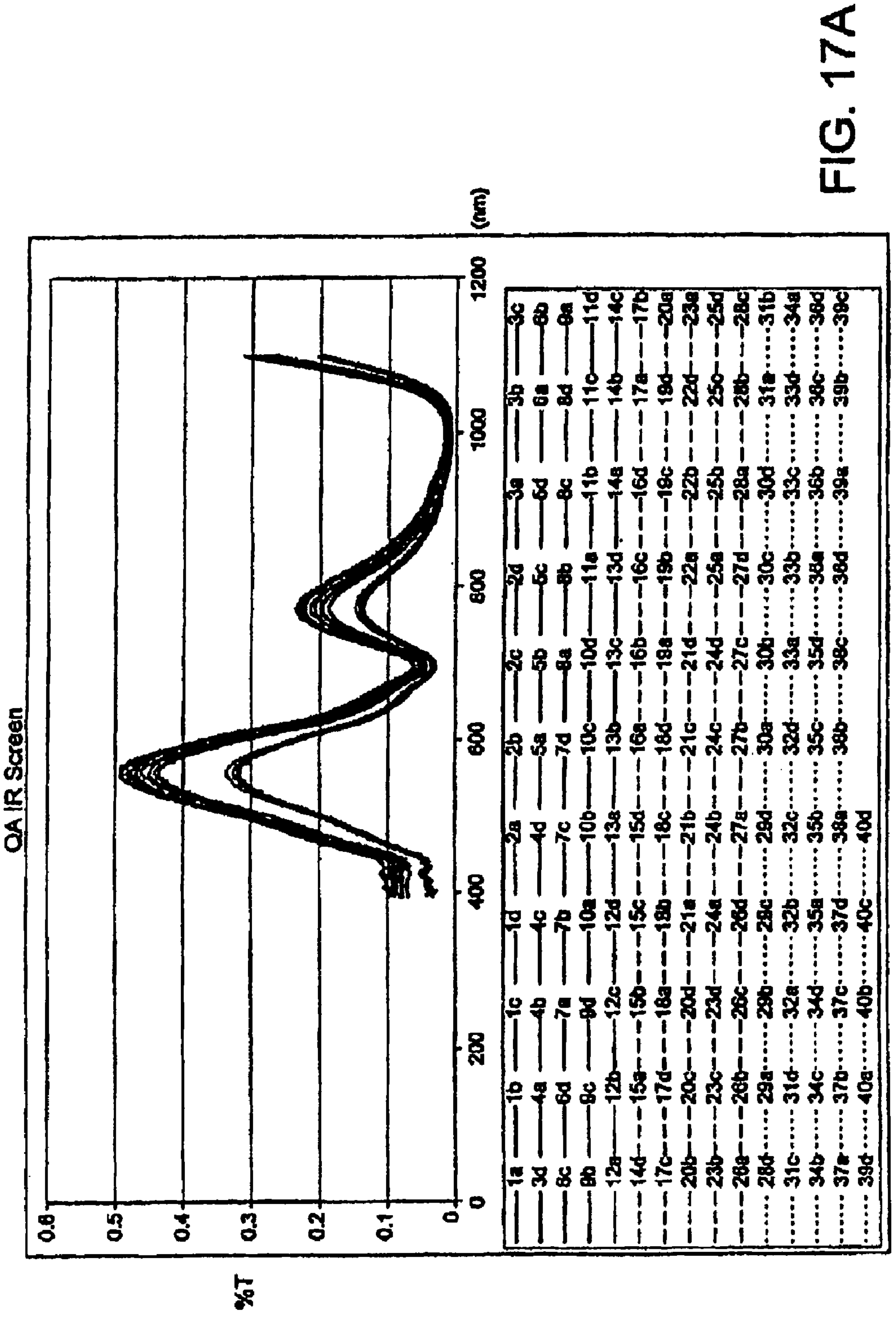
Figure 17B:
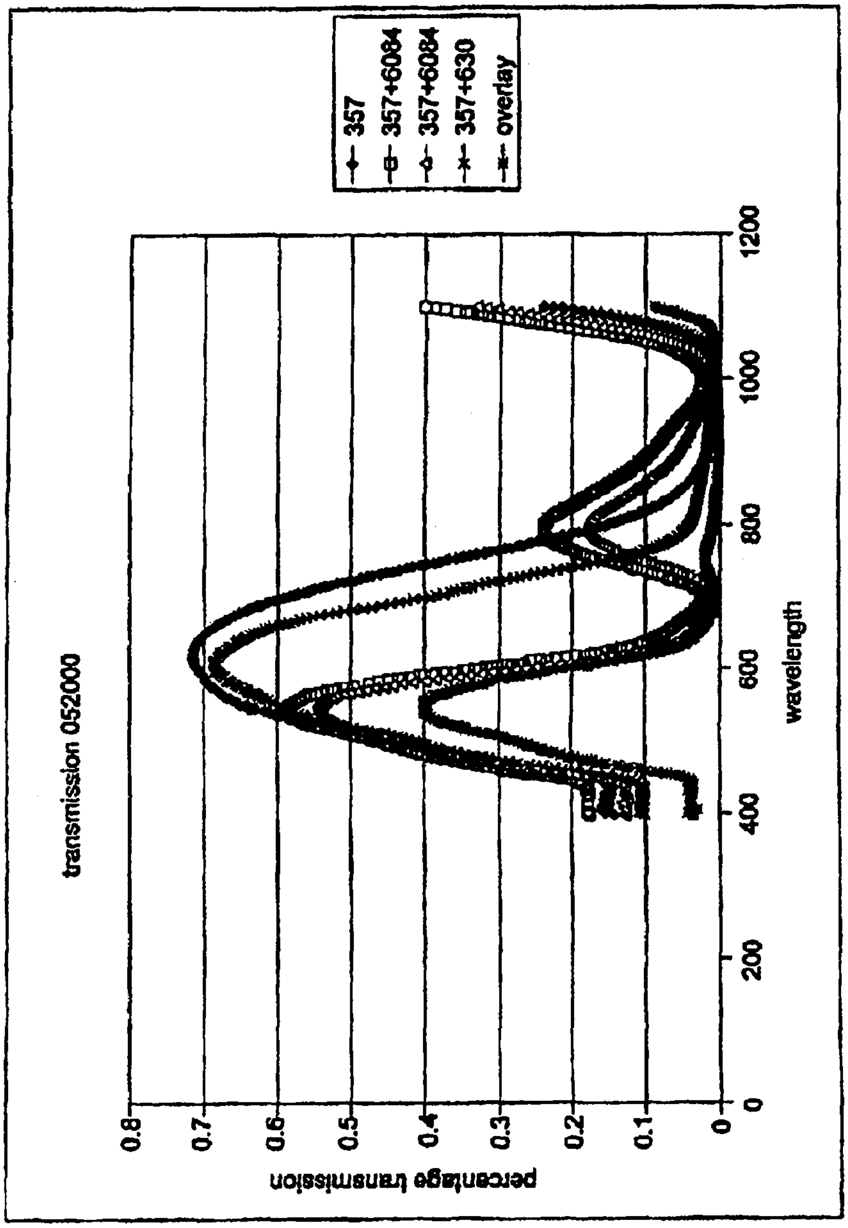
Figure 17C:
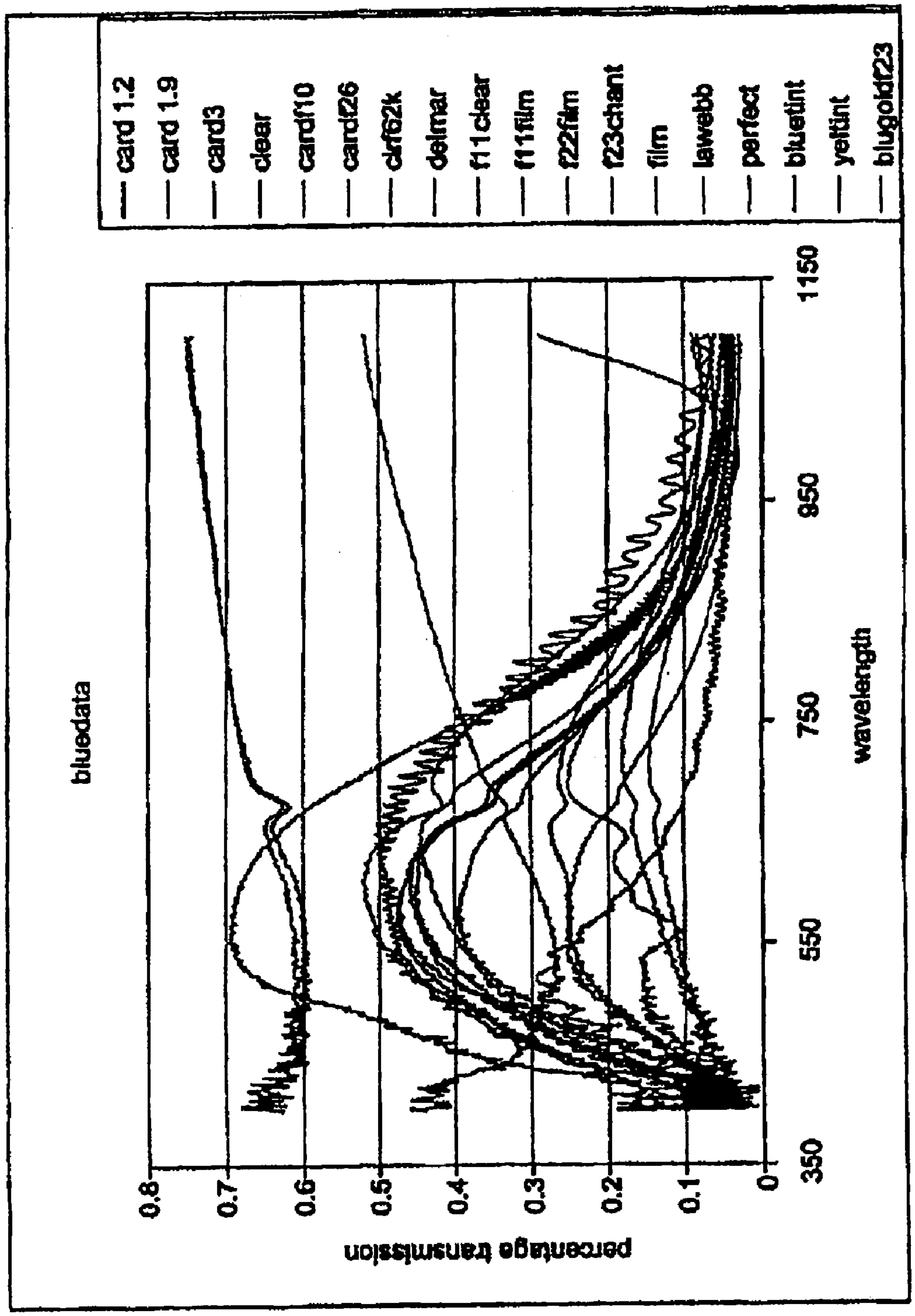
Figure 17D:
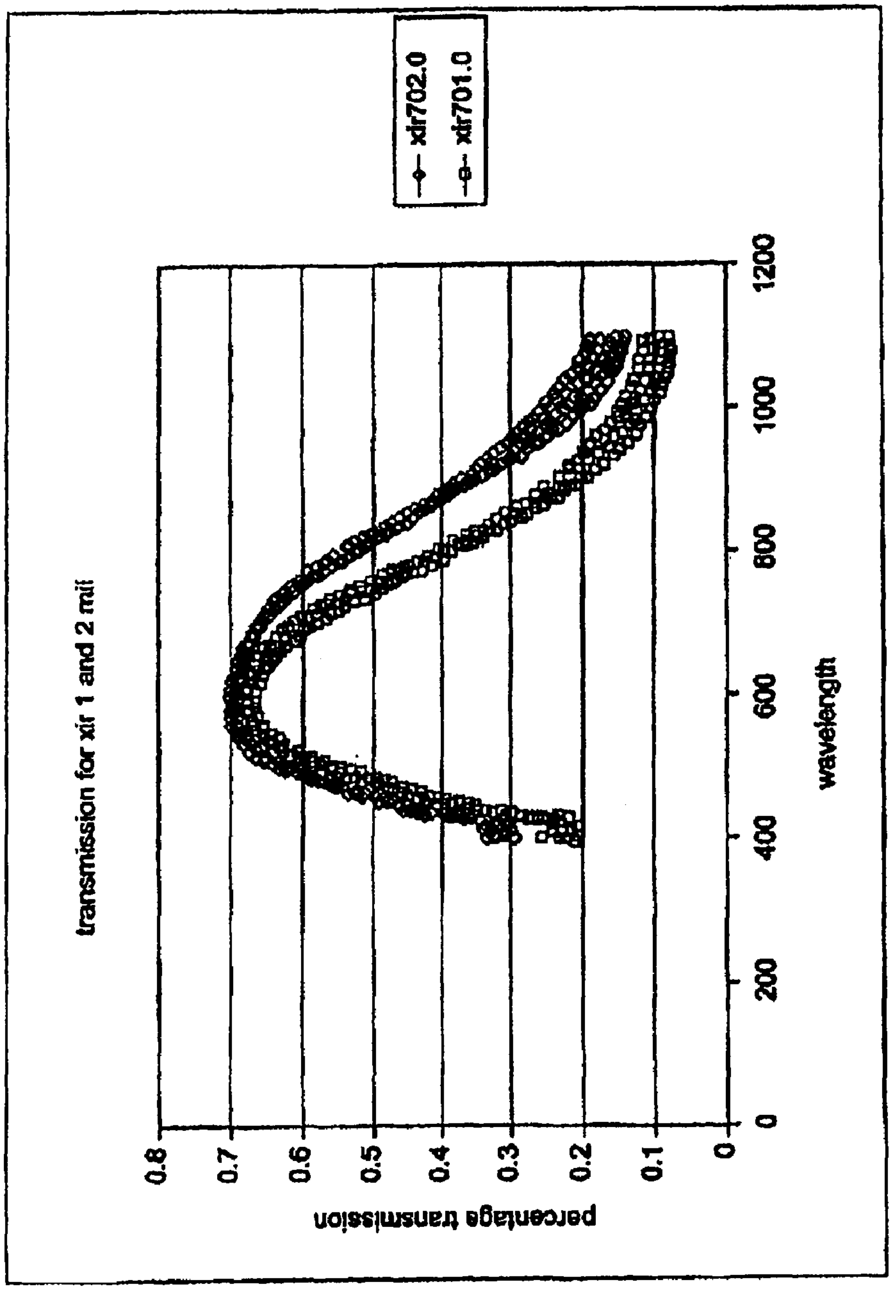
Figure 17E:
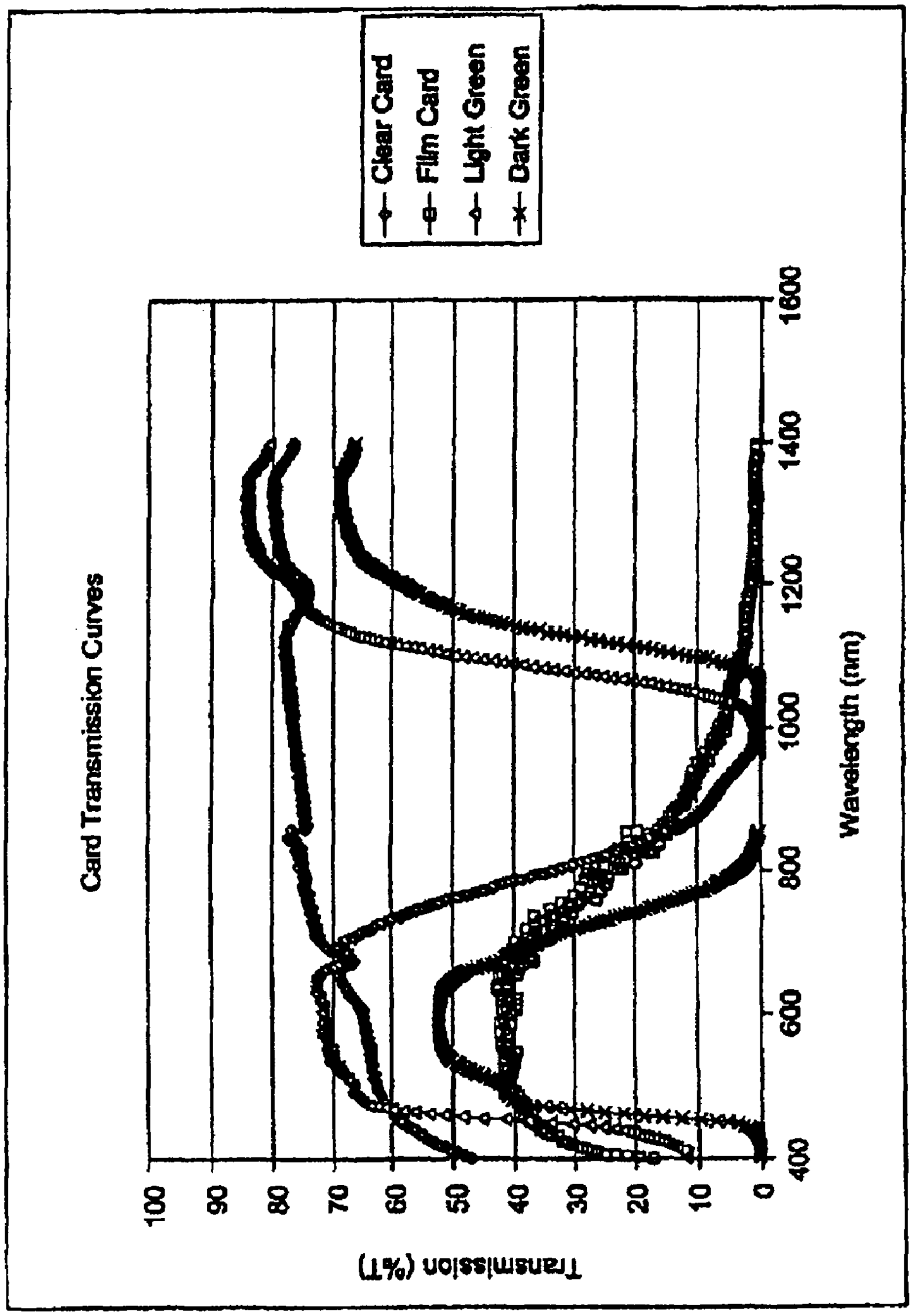
Figure 17F:
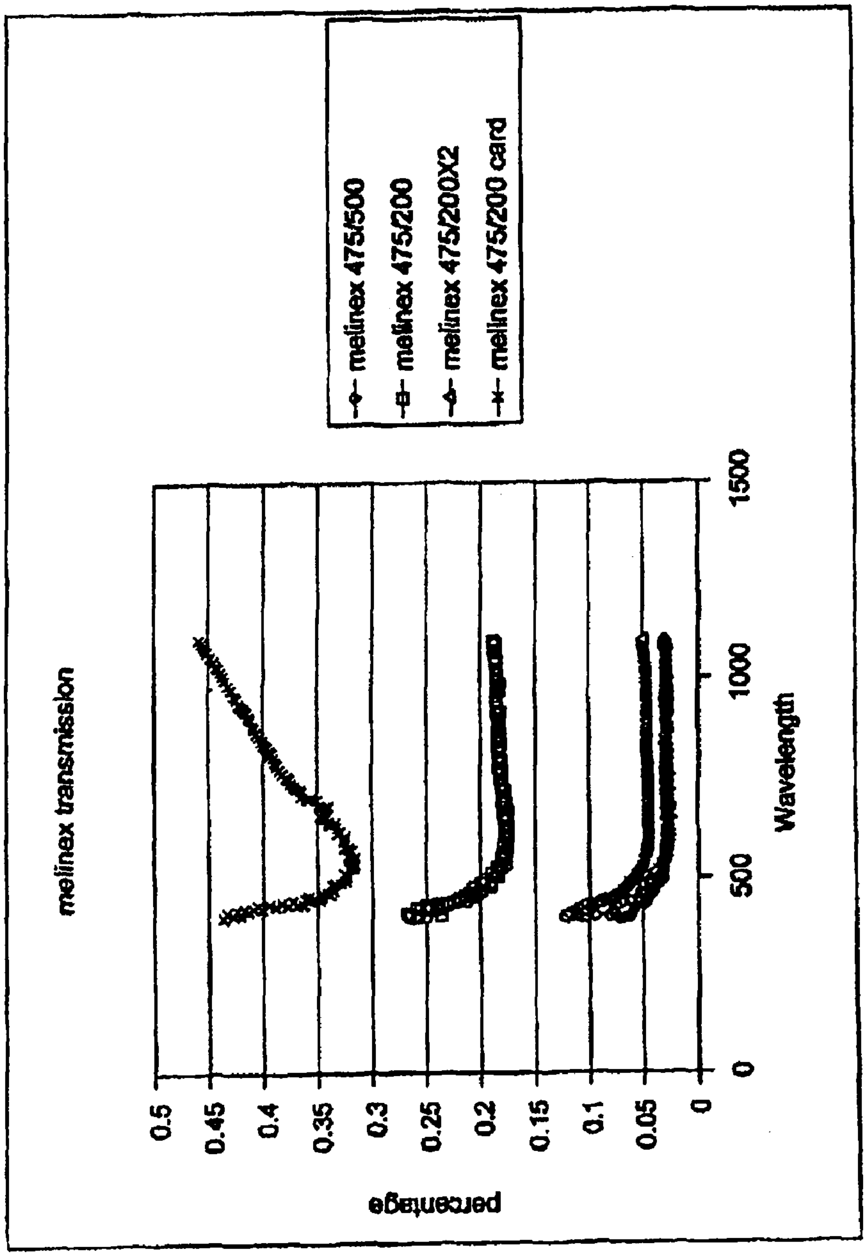
Figure 17G:
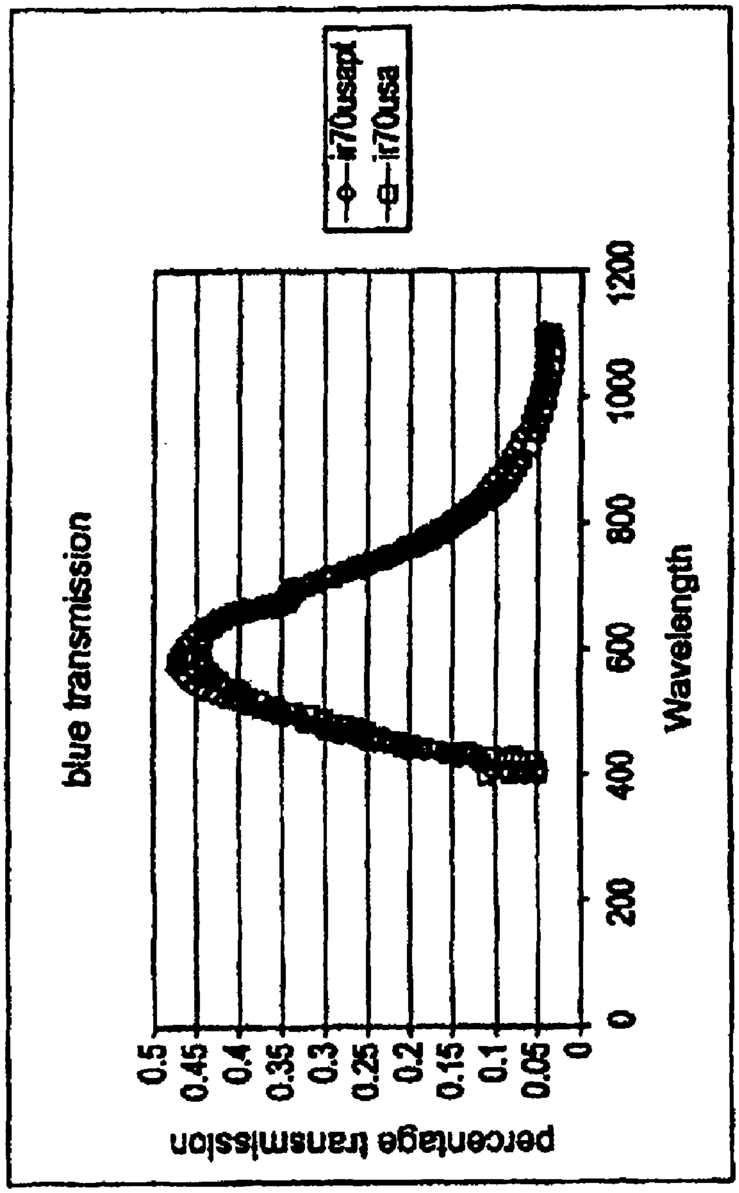
Figure 17H:
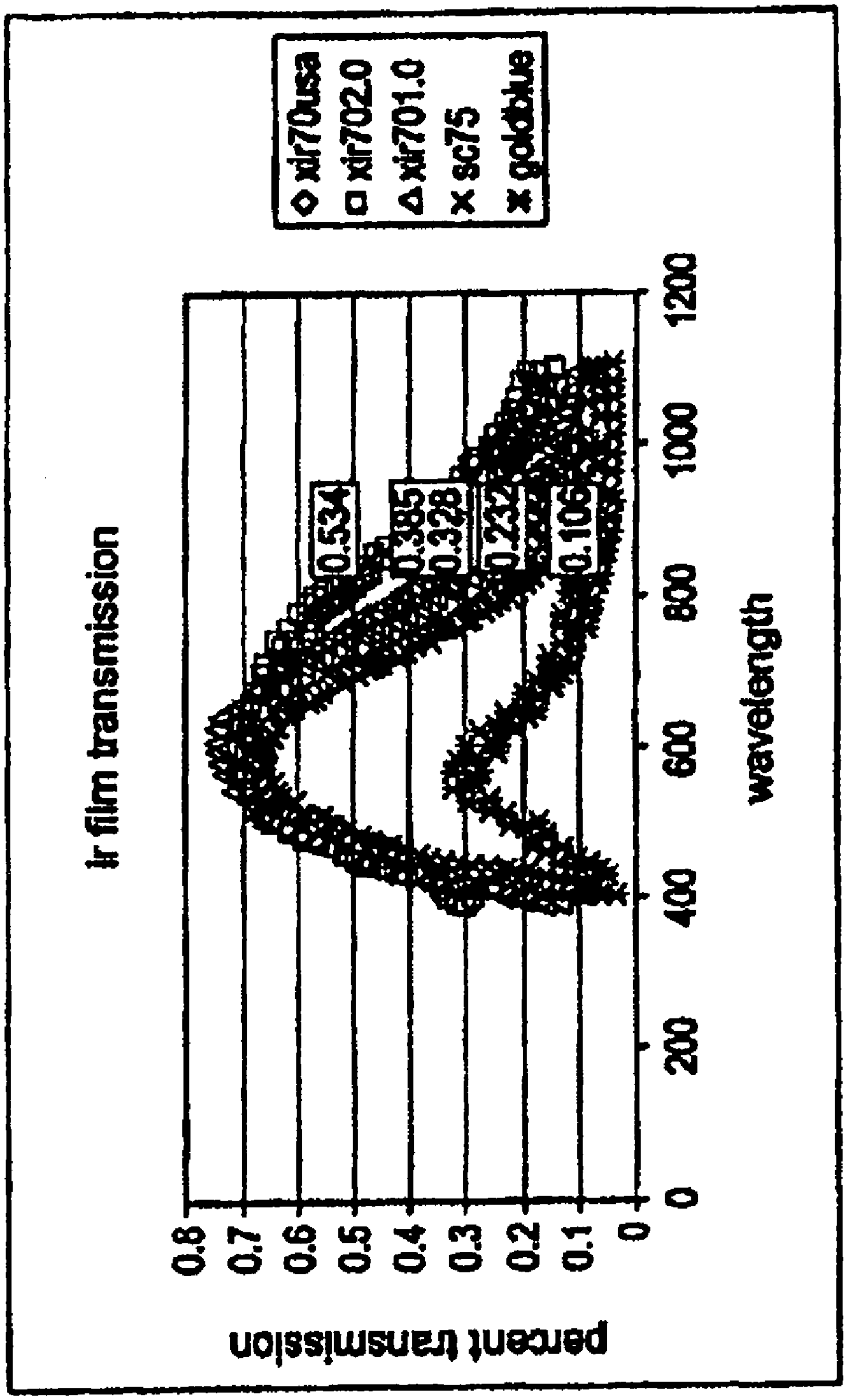
Figure 17I:
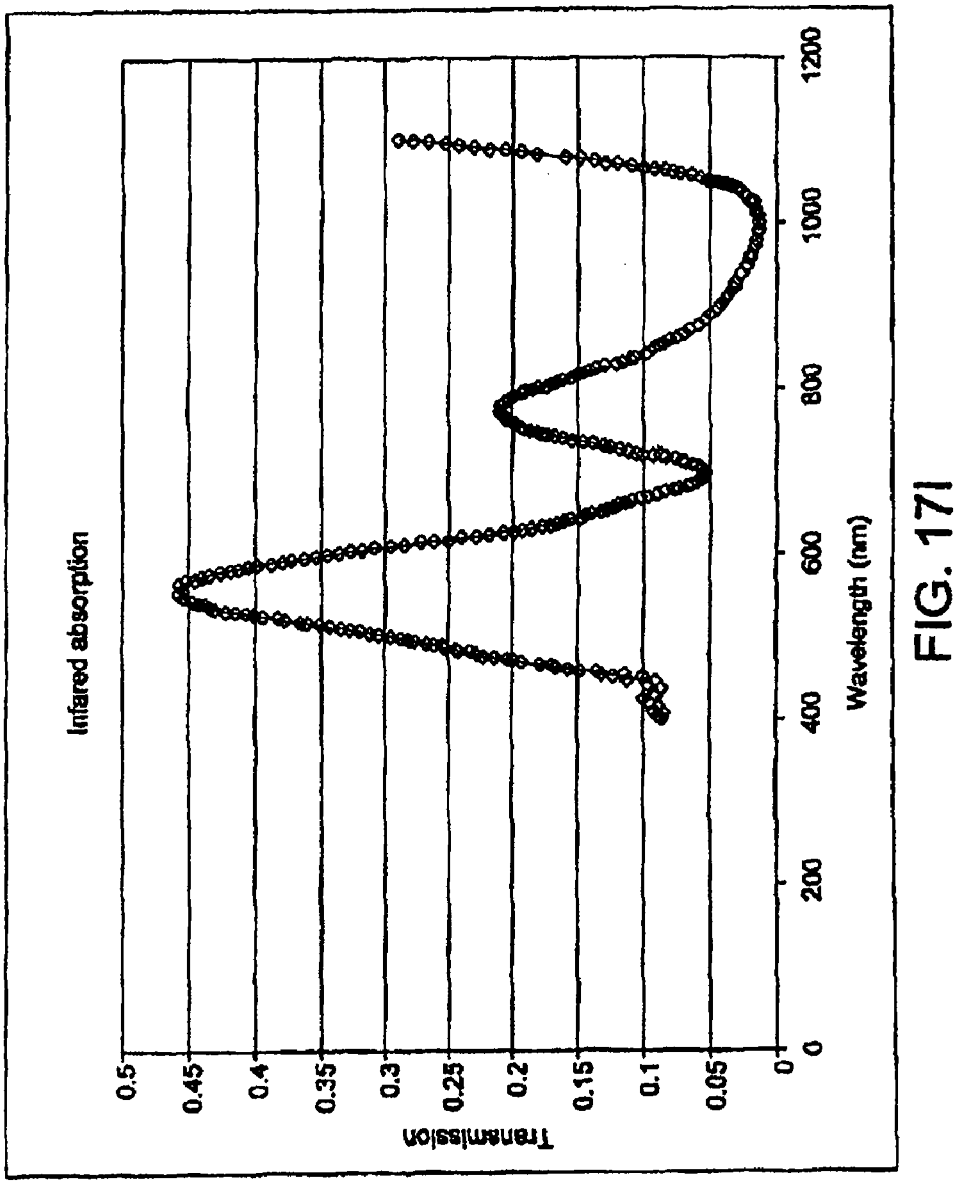
Figure 17J:
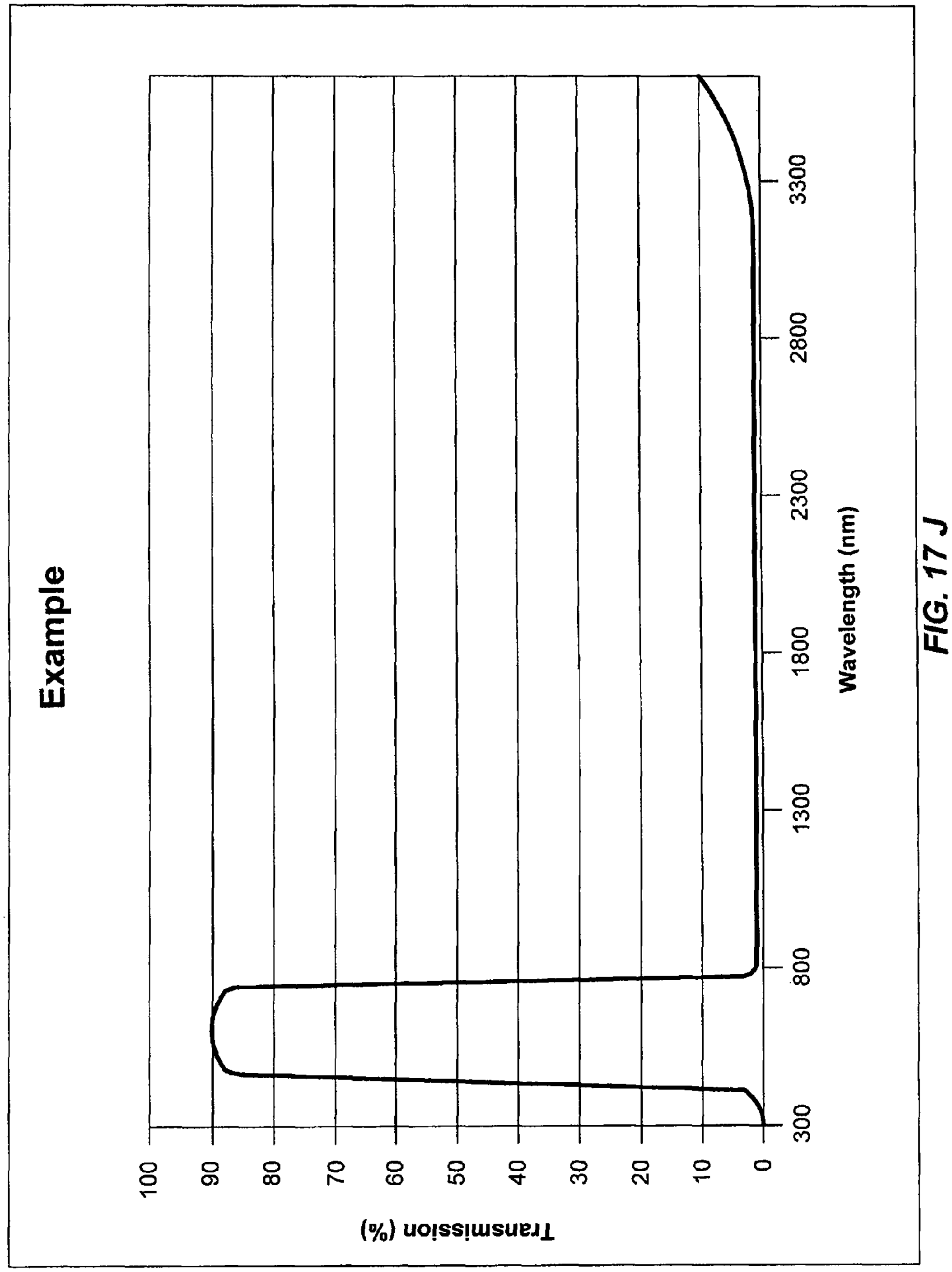

FIGS. 17A-17I show exemplary test results for various card embodiments in a graph of percent transmission v. wavelength (nm). For example, with respect to FIG. 17A, the quality assurance of IR ink on PVC with no text is tested wherein a curve represents one of four corners of an exemplary card. Subsequent curves represent another card sample which was selected after an interval of card production, such as, for example, after about 50 cards. FIG. 17B shows the percent transmission of different wavelengths of light through cards having different ink formulations, wherein each curve represents a card with a different ink formulation.

FIGS. 17C-17J represent various spectra of films, coatings, cards, etc. which demonstrate the ability of the materials used in the card constructions to block sufficient quantities of infrared radiation and transmit visible light in order to produce cards described in the embodiment. The mechanism of blocking may be absorption, reflection, diffusion, dispersion or other methods of blocking radiation in the electromagnetic spectrum.

Figure 4:
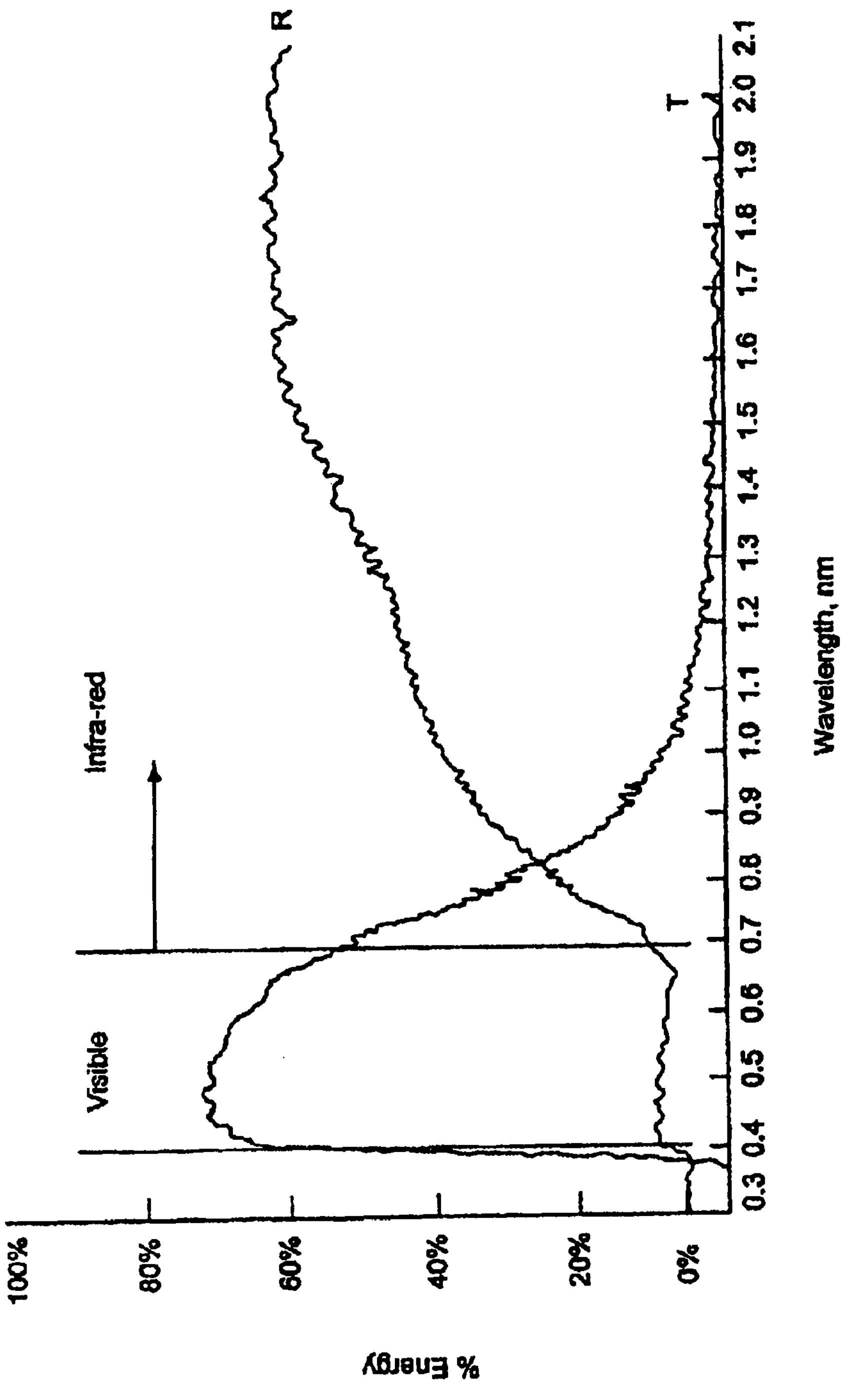
FIG. 4 is a graph of energy v. wavelength for the reflection and transmission of IR film in accordance with an exemplary embodiment of the present invention.
Figure 5:
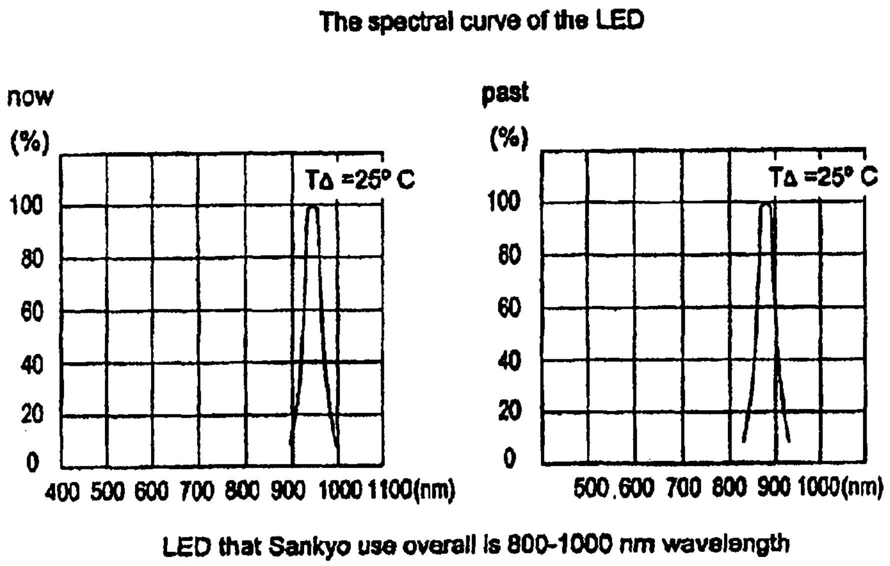
FIG. 5 is a graph of a typical IRED (infrared emitting diode) source in an ATM having a wavelength in the range of about 820-920 nm or 900-1000 nm in accordance with an exemplary embodiment of the present invention.
Figure 6:
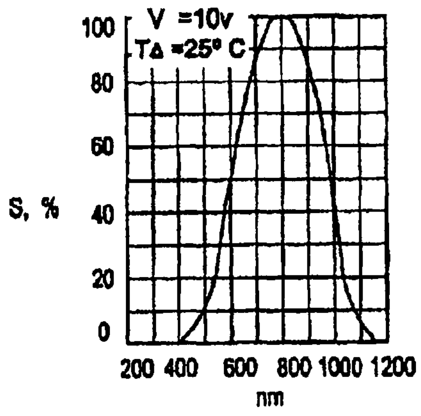
FIG. 6 is a graph of a spectral sensitivity curve of a typical phototransistor having a wavelength in the range of about 400 nm-1100 nm in accordance with an exemplary embodiment of the present invention.

In addition to the IR inks, the infrared blocking compound may alternatively be a film or hot mirror which also blocks (absorbs or reflects) infrared light, but transmits all other wavelengths of light. In an exemplary embodiment, the film is set between the front sheet 10 and back sheet 12. FIG. 4 is a graph of energy v. wavelength for the reflection and transmission of an exemplary IR film in accordance with an exemplary embodiment of the present invention. FIG. 4 shows that, while the visible light is transmitted through the film, the infrared light is blocked at higher wavelengths and a substantial amount of infrared light is reflected.

The infrared blocking compound may be incorporated into plastic products, films, products, documents or other articles which may inhibit detection via phototransistors, CCD's, and/or the like. The material may be incorporated into a transaction card via a film, plastic, printing ink, coating or other application medium by grinding or the use of dispersed or deposited material into a liquid, paste or other type of medium. To minimize environmental damage to the ink, such as the ink being scratched, the ink may be applied directly onto the plastic sheets under the laminate (described below in step 170). Moreover, the infrared ink may be applied on the inside or outside surface of the plastic sheets.

In an exemplary embodiment, incorporating the infrared blocking compounds into an article may not require a separate printing unit, modifications to existing processing equipment or an additional operational step. Particularly, the fabrication of the articles, such as a transaction card, utilizes existing equipment which incorporate colorants anyway, so the application of the infrared blocking compounds to the existing colorants do not add extra equipment or steps to the process.

In a further exemplary embodiment, the infrared blocking compounds block light which is detectable by machines. More particularly, the machines suitably detect the presence of a card via infrared interference at one or several wavelengths. In an exemplary embodiment, detection of materials may include the production of a visual effect when the materials are interrogated with invisible infrared radiation from the proper instrument, and when such radiation contacts the infrared material, a visual effect, such as a colored light, may be seen. Alternatively, the materials may be detected by a remote detector that will indicate the presence of the materials. Detection or authentication of the materials occurs above and below the stimulation wavelength of the reading device. As such, once the infrared blocking compound has been detected, the detection device may then provide the user with a positive identification signal, which may be located on or near the detection device.

Figure 8:
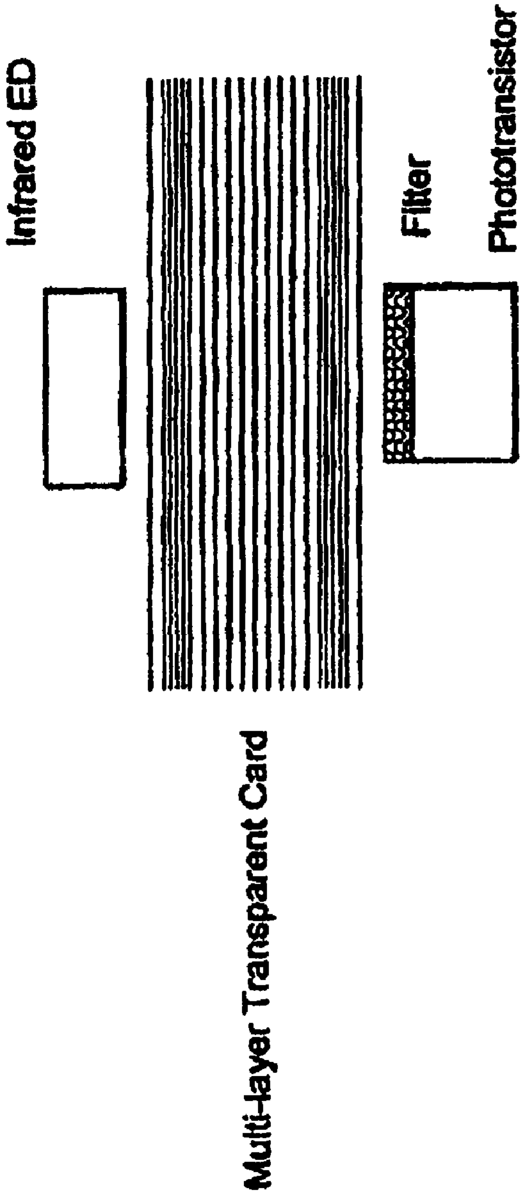
FIG. 8 is a schematic diagram of an exemplary sensor mechanism within an ATM in accordance with an exemplary embodiment of the present invention.

In an exemplary embodiment, the detection of IR materials trigger the sensors in ATM machines. In particular, with respect to FIG. 8, the present invention allows for the passage of a greater percentage of visible light (from about 400 nm to 700 nm), which allows the card to appear translucent in nature, while allowing for the blockage of certain light (from about 700 nm and above) to allow the phototransistors in ATM's to detect that a card has been inserted into the carriage mechanism. As discussed above, an exemplary ATM sensing device includes an IRED, a filter and a phototransmitter.

In addition to triggering the sensors in ATM machines, translucent card 5 may be used with any magnetic stripe or smart card reader. The reader system may include a card reader/writer, a point-of-sale terminal, ATM or any other acceptance device. In an exemplary embodiment, card 5 is used in conjunction with a reader which, not only detects the existence of the card, but also illuminates the transparent portion of card 5 when the card is inserted into the reader. The illumination source may be either an incandescent or solid state source (infrared emitting diode or laser). In operation, when the card is inserted into the acceptance device, the edge of the card presses against the illumination assembly (or activates a switch, interrupts a beam, etc.). Depending upon the application of the card, the illumination source may be under the control of the acceptance device or external software. Thus, the illumination source may flash or display a particular color if directed by the external software program. Additionally, depending on the structure of the card, the illumination source may be used to excite an embedded design useful for security or product enhancement.

Figure 2:
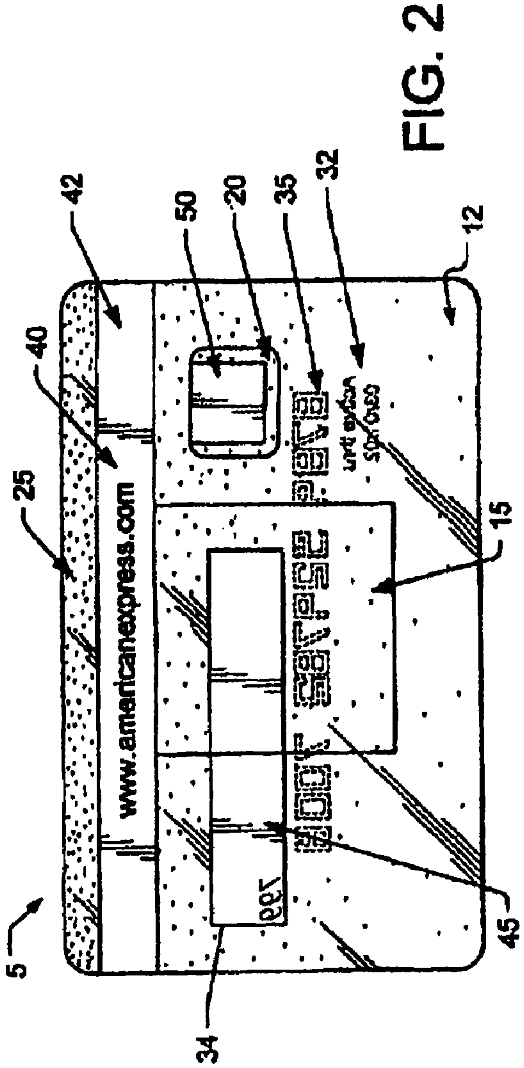
FIG. 2 is a back view of an exemplary transaction card in accordance with an exemplary embodiment of the present invention.

As discussed above, the infrared blocking compounds may be incorporated into any type of article. An exemplary article is a transaction card which may itself include any number of numerous features. In an exemplary embodiment, the present invention includes, generally, a transaction card 5 comprised of base containing opaque, transparent or translucent plastic layers 10, 12 and multiple features affixed to the card 5 such as text 30, 32, 34, logos 50, embossed characters 35, magnetic stripe 42, signature field 45, holographic foil 15, IC chip 20 and opacity gradient 25 (FIGS. 1 and 2)

Card 5 also includes an infrared blocking compound, described above, for allowing the transparent or translucent transaction card 5 to be recognized by card reading devices, such as ATMs, and/or for allowing the transparent transaction card 5 to be recognized and counted during card fabrication. The infrared blocking compound on transparent card 5 is a substantially invisible or translucent infrared ink, mirror or film which blocks (absorbs or reflects) infrared light but transmits all other wavelengths of light (see FIG. 4). Card 5 may be used for credit, charge, debit, access, identification, information storage, electronic commerce and/or other functions.

Figure 3:
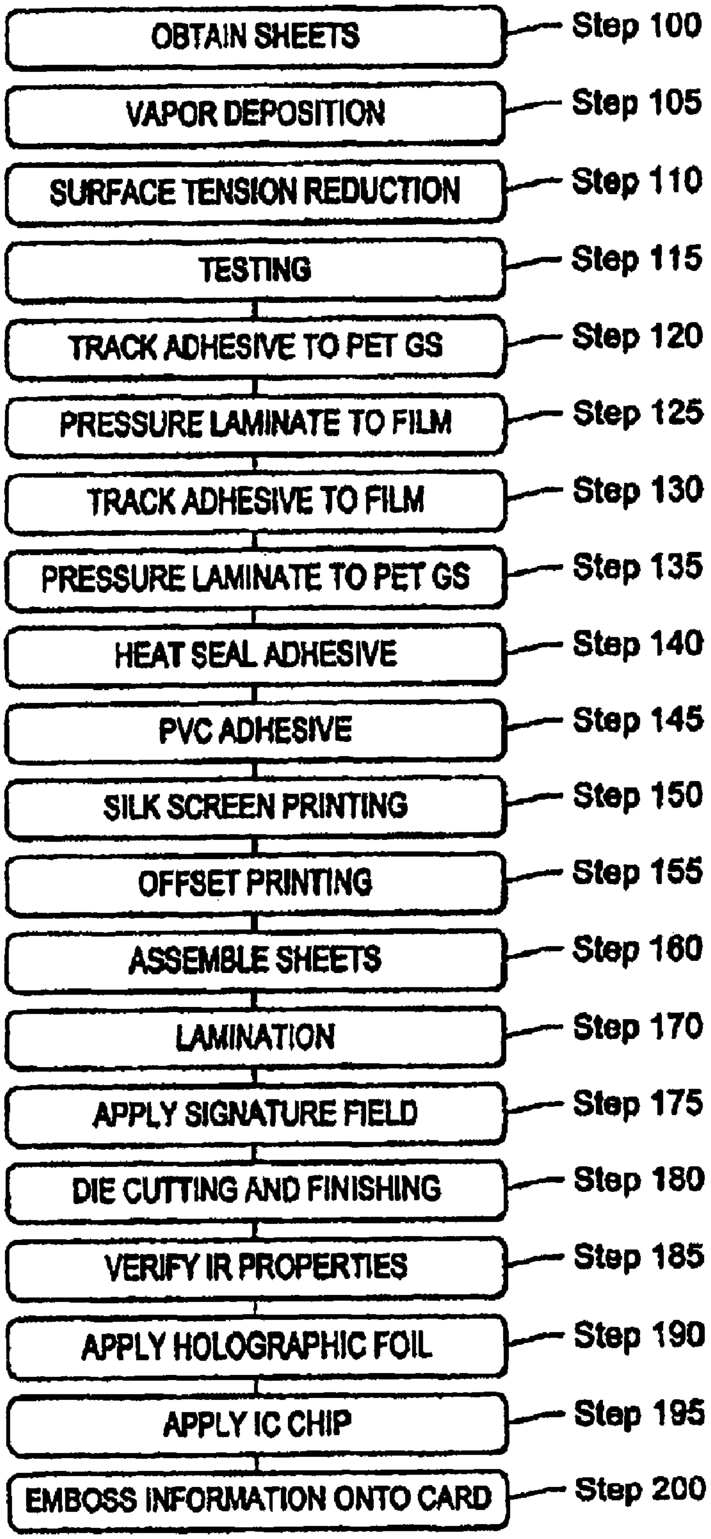
FIG. 3 is a flow diagram of the card fabrication process in accordance with an exemplary embodiment of the present invention.

With respect to FIG. 3, to fabricate card 5 having a front and back surface in accordance with an exemplary embodiment of the present invention, a front sheet 10 and back sheet 12 (FIGS. 1 and 2) consisting of a plastic substrate such as, for example, clear core PVC, are produced (step 100). One skilled in the art will appreciate that sheets 10 and 12 of card 5 may be any suitable transparent, translucent and/or opaque material such as, for example, plastic, glass, acrylic and/or any combination thereof. Each sheet 10, 12 is substantially identical and may be about 3'×4' (622 mm×548 mm) and about 0.005-0.350 inches, or may be 0.01-0.15 inches or 13.5 mil thick.

Figure 7A:
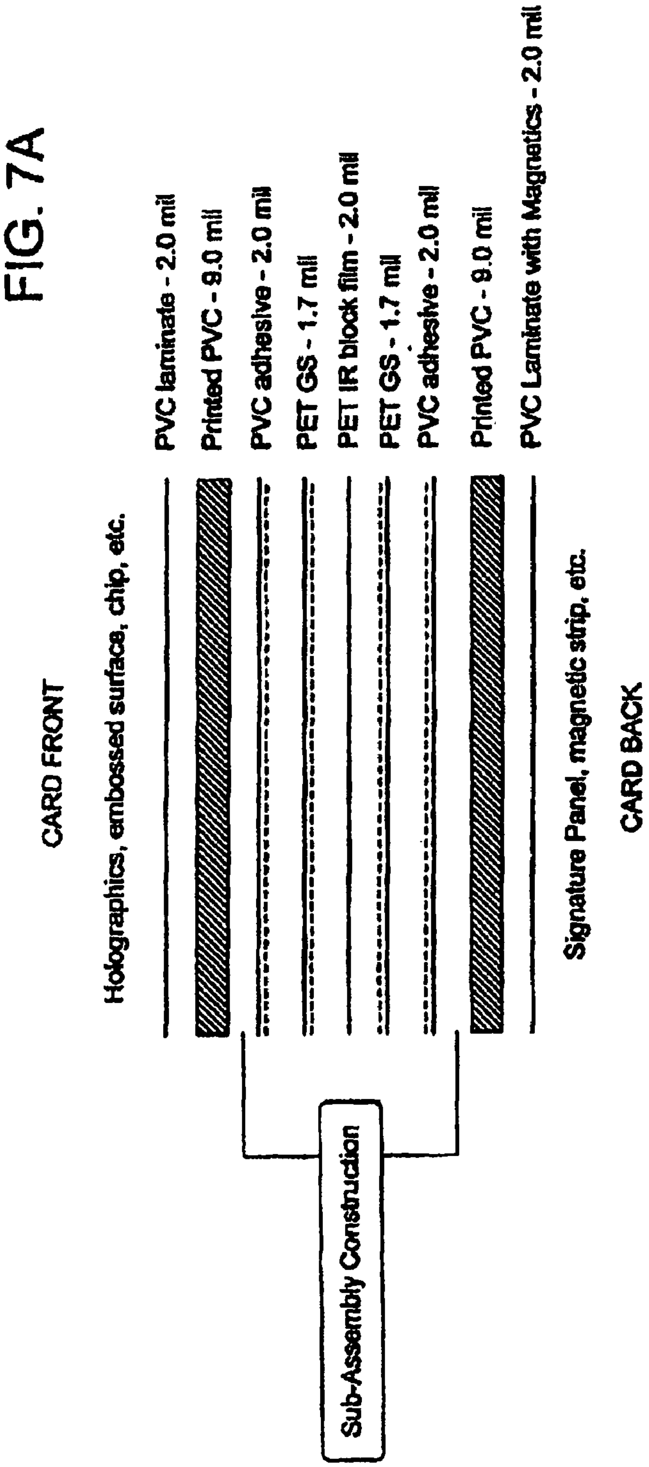
FIGS. 7A-7J show various embodiments of card layers in accordance with exemplary embodiments of the present invention.
Figure 7B:
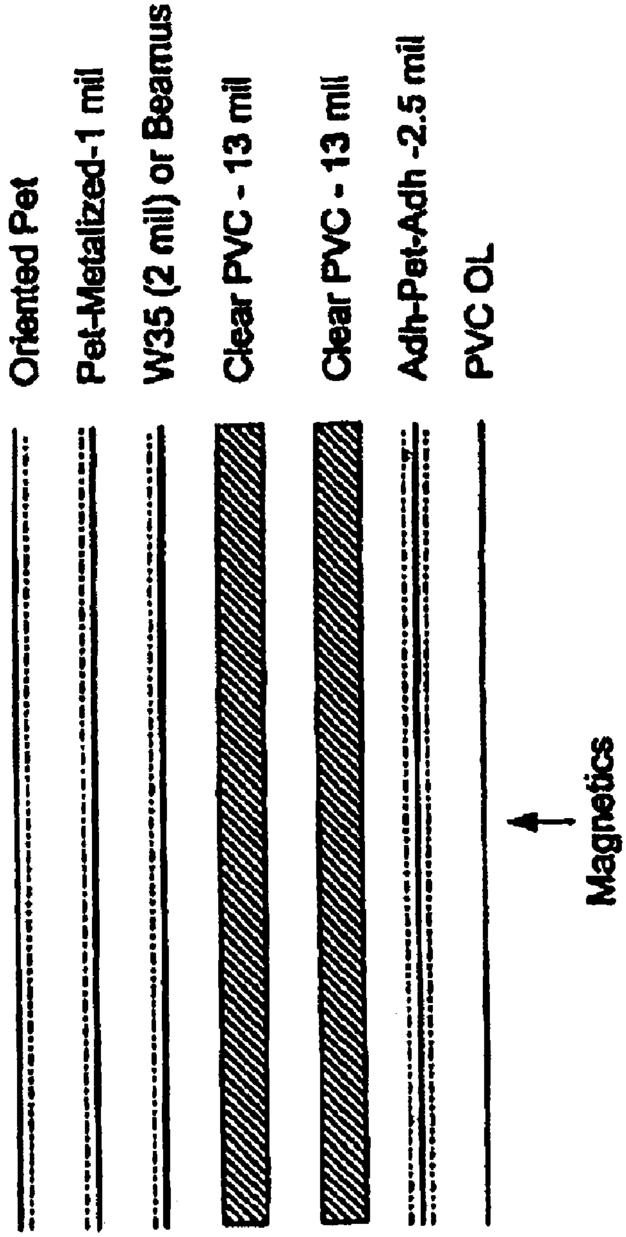
Figure 7C:
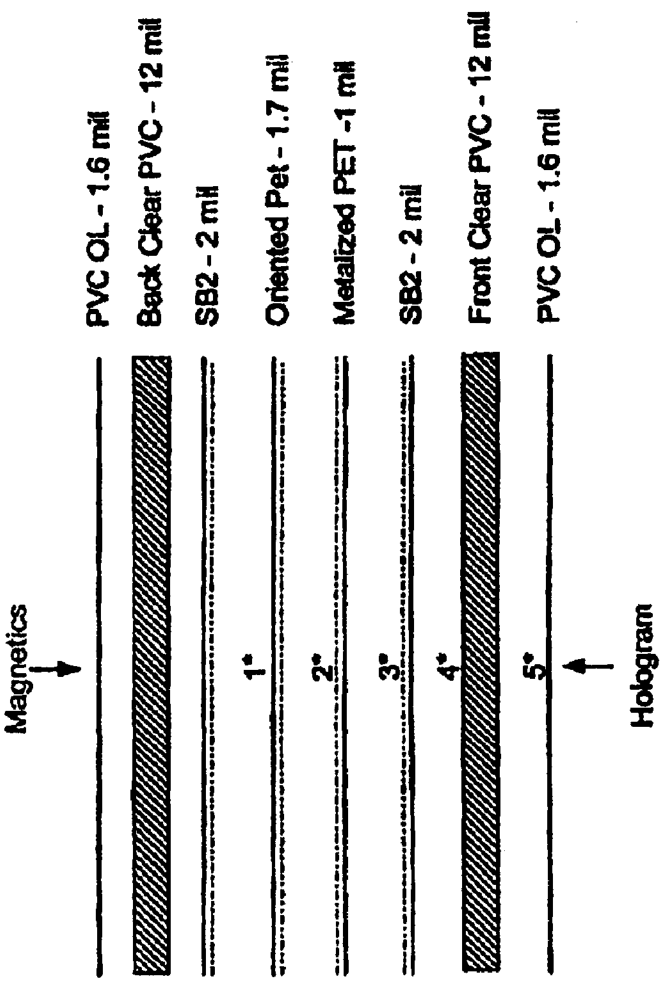
Figure 7D:
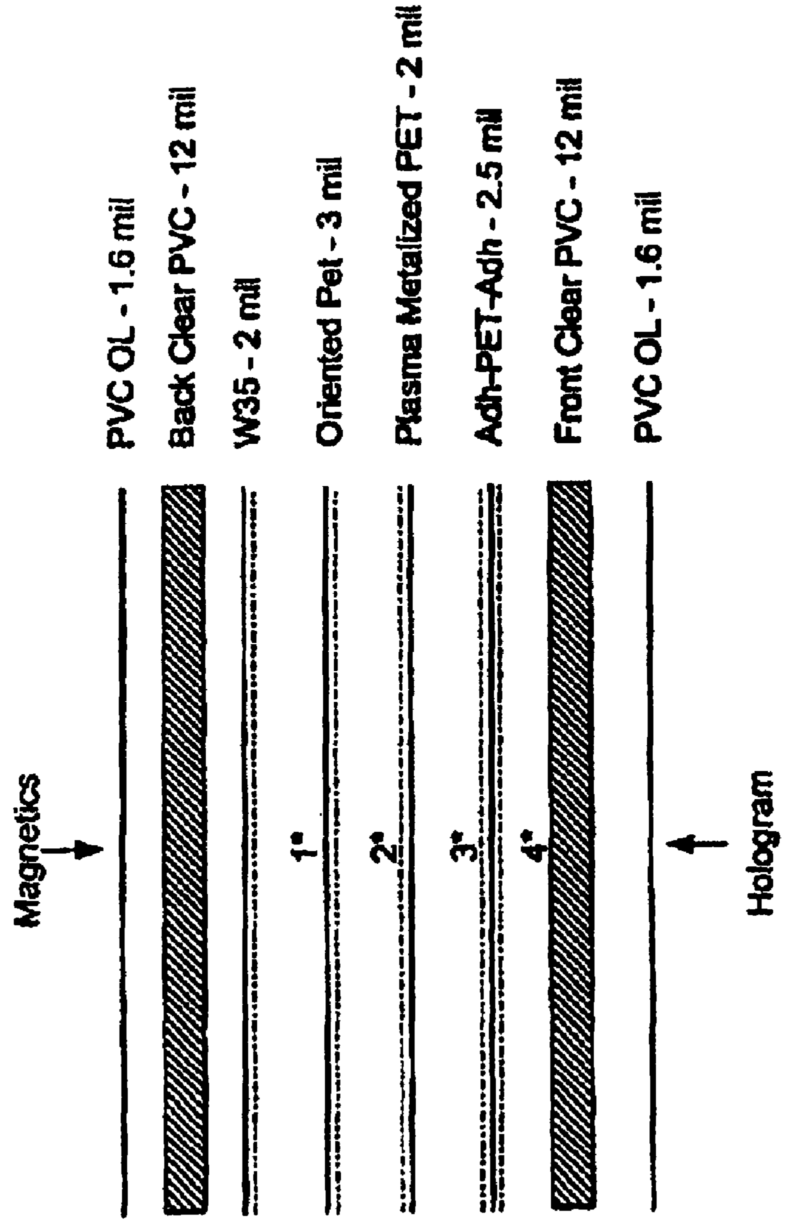
Figure 7E:
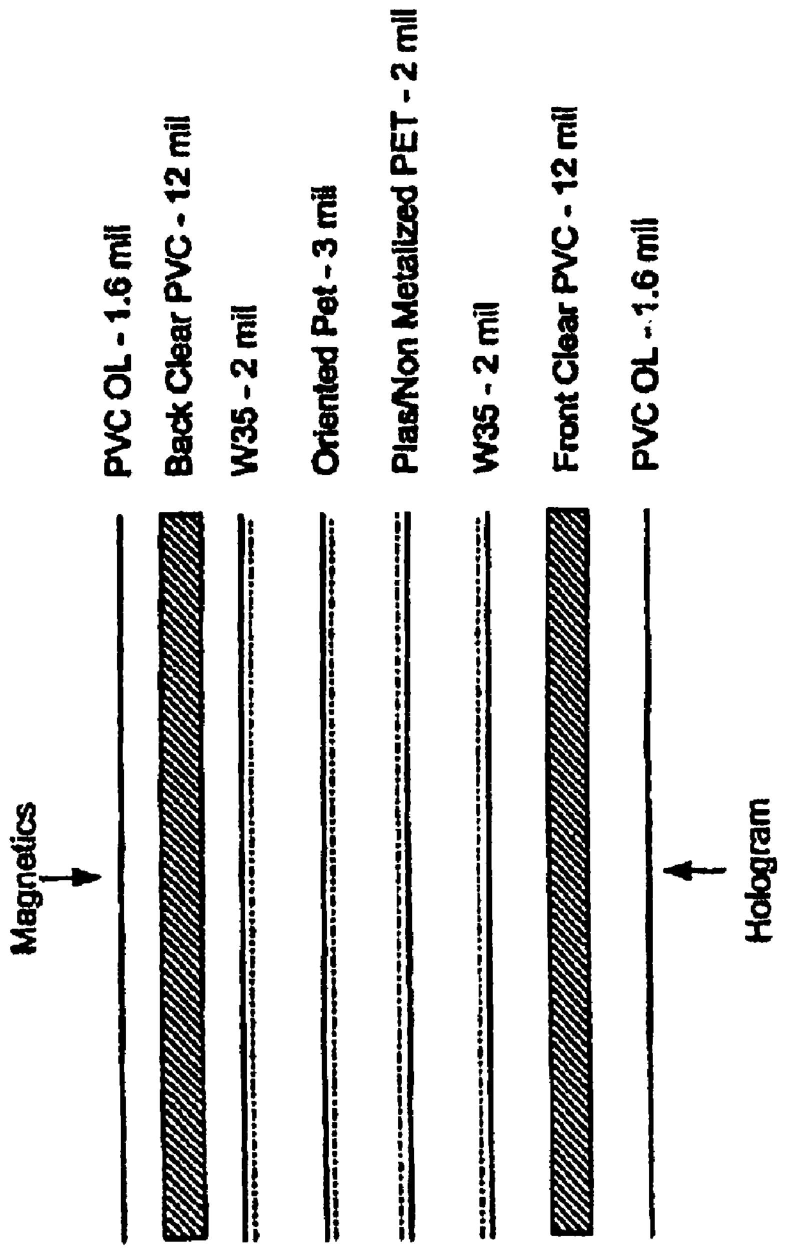
Figure 7F:
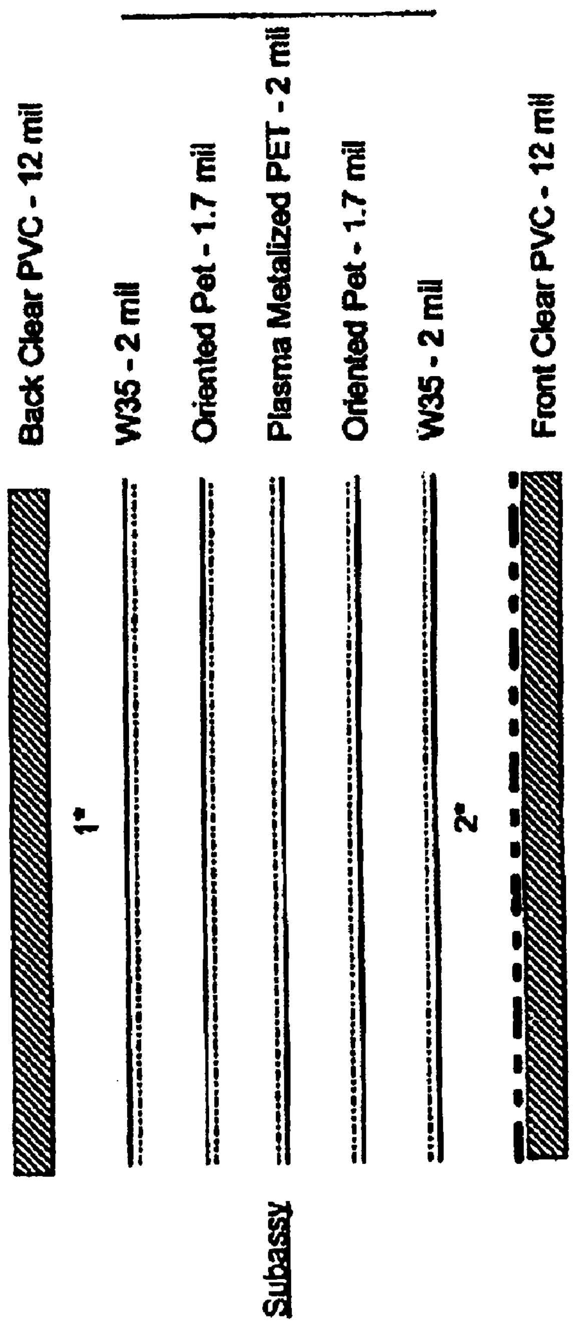

With respect to FIG. 7A, the fabrication of the individual card sheets includes either direct layout (9 layers) of film or the use of a sub-assembly (5 layers). An exemplary sub-assembly consists of 5 layers of film with room temperature tack adhesive applied over thermoset and thermoplastic adhesives. The resulting cards comprise (from the card front towards the card back) 2.0 mil outer laminate (PVC, polyvinylchloride) having the holographic foil, embossed surface, chip and other indicia on its surface, 9.0 mil printed PVC core with print side out (card front), 2.0 mil PVC adhesive, 1.7 mil PET GS (extrusion coated polyethyleneterephthalate-gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (card back), and 2.0 mil outer back laminate with a signature panel, applied magnetic stripe and other indicia. Optimally, the PET IR blocking film is fabricated in the middle of the layers to balance the card and minimize warping of the resulting card product. Other exemplary embodiments of the layers are shown in FIGS. 7B-7H.

Figure 7G:
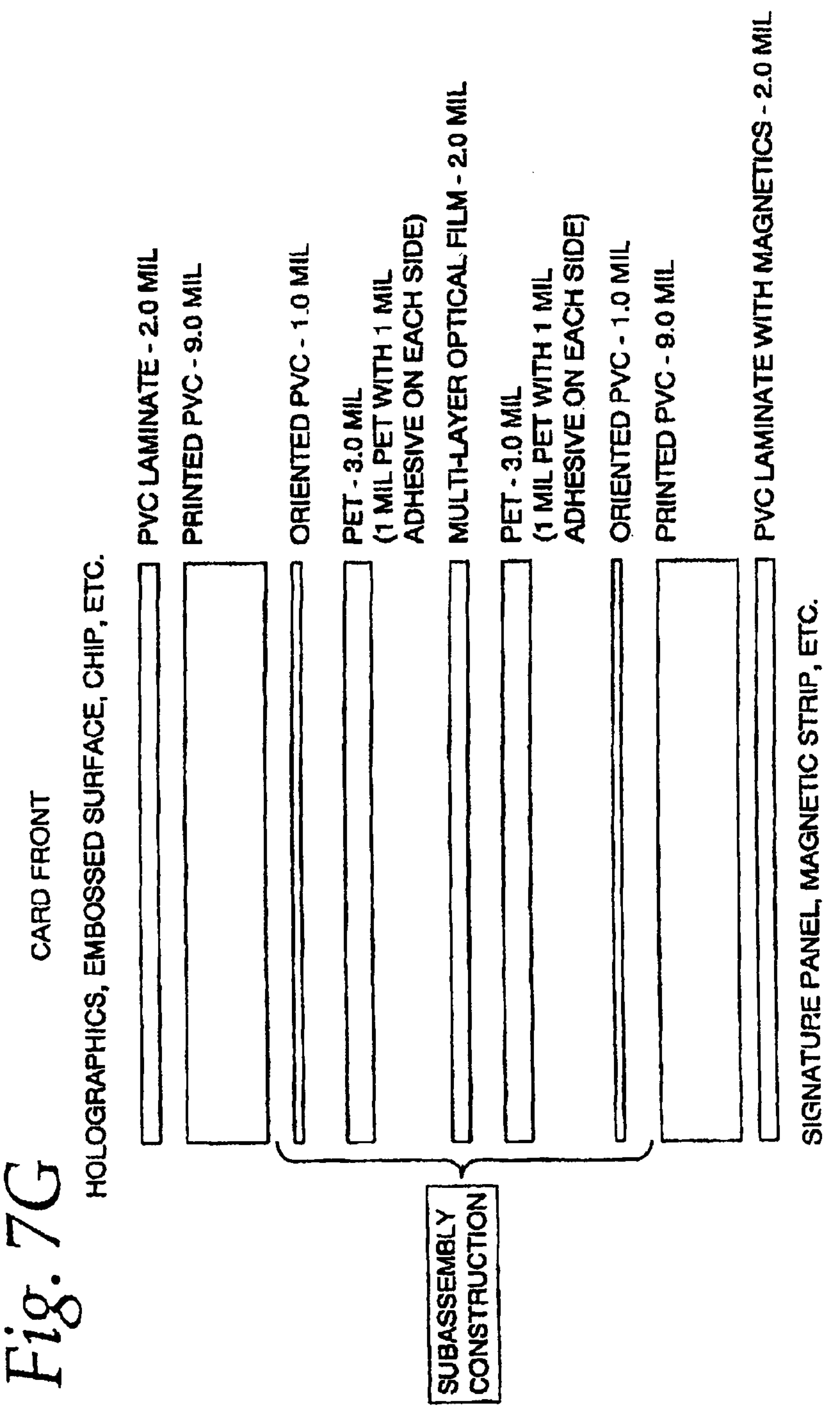
Figure 7H:
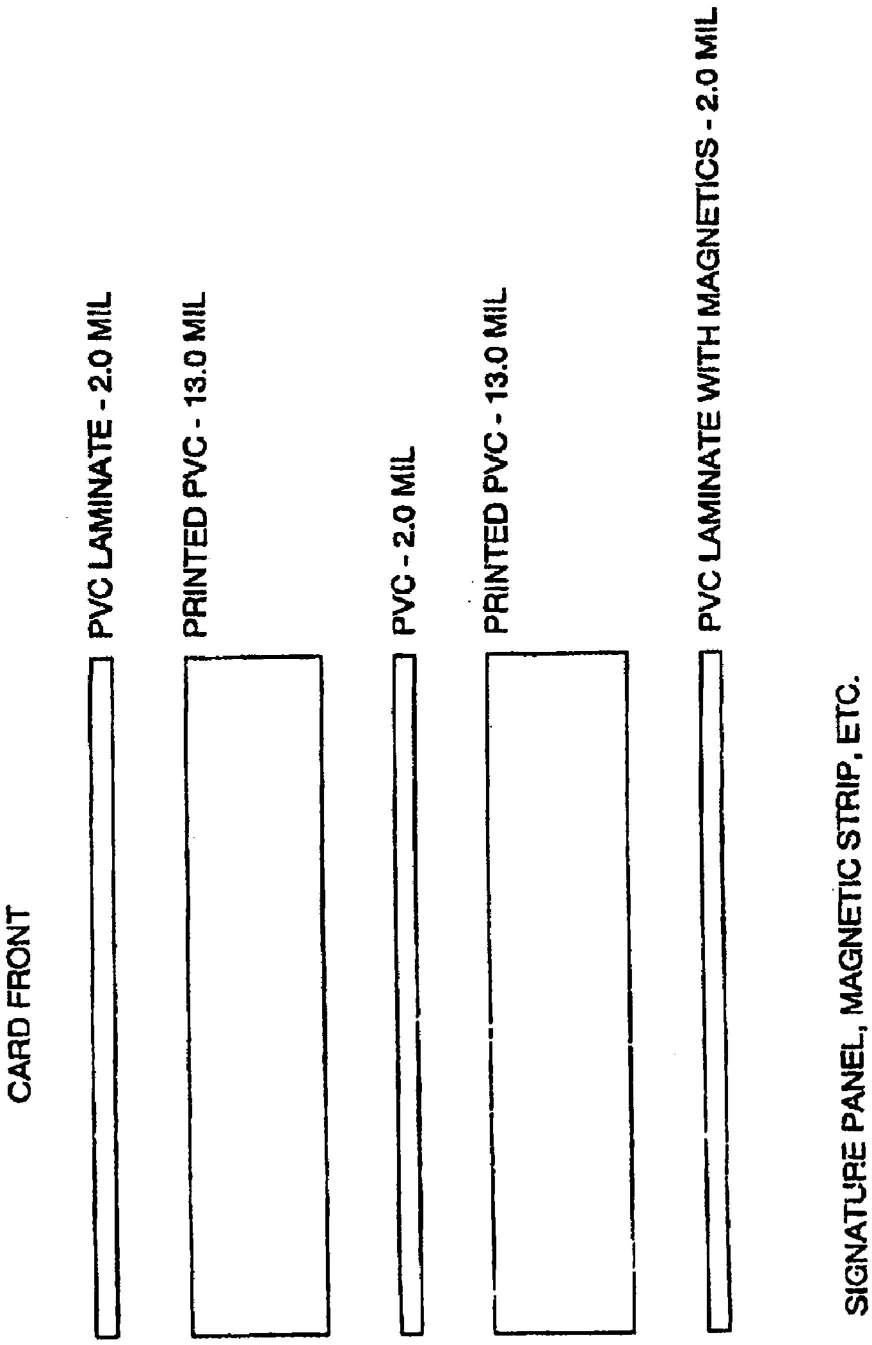

Specifically, FIG. 7G illustrates an alternate embodiment of the individual transaction cards. As with FIG. 7A, card sheets may be constructed as described in FIG. 7H. Each card sheet may include nine layers of film or the use of a five layer subassembly. The resulting cards comprise (from the card front towards the card back) about 2.0 mil outer laminate (PVC) having the holographic foil, embossed surface, chip and/or other indicia on its surface, about 9.0 mil printed PVC core with print side out (card front), about 1.0 mil oriented PVC, about 3 mil adhesive (1 mil PET with 1 mil adhesive on each side), about 2.0 mil PET IR blocking film, as described above, about 3.0 mil adhesive (1 mil PET with 1 mil adhesive on each side), about 1.0 mil oriented PVC, about 9.0 mil printed PVC core with print side out (card back), and about 2.0 mil outer PVC laminate comprising a signature panel, applied magnetic stripe and/or any other indicia apparent to one having ordinary skill in the art. As with the card described in FIG. 7A, the PET IR blocking film is fabricated in the middle of the layers to balance the card and minimize warping of the resulting card product.

The adhesive layers described above with reference to FIG. 7G (the 3.0 mil adhesive) that may be disposed on either side of the 2.0 mil PET IR blocking film may comprise a first layer of a polyester (1.0 mil PET) having second and third layers of a polyester-based adhesive disposed on either side of the first layer of polyester. The polyester-based adhesive layers may each be about 1.0 mil. The polyester-based adhesive layers exhibit excellent adhesion to polyester and PVC, in that it binds to both the PET IR blocking film on one side of the 3.0 mil adhesive and the 1.0 mil oriented PVC layer on the other side. Specifically, a material that may be used as the polyester-based adhesive is Bemis Associates Inc. 5250 Adhesive Film. Alternatively, another material that may be used as the polyester-based adhesive is Transilwrap Company, Inc. Trans-Kote® Core Stock KRTY.

The card sheet of FIG. 7G, including the nine layers of film and/or the use of a five layer subassembly, as described above, may be constructed together by a lamination process as is known to someone having ordinary skill in the art using heat and pressure. A method of constructing the cards as described in FIG. 7H utilizes a two-step lamination cycle, wherein a first hot step includes laminating the layers of the cards together at a pressure of about 170 psi at a temperature of about 300° F. for about 24 minutes. A second step includes laminating the layers together at a pressure of about 400 psi at a diminished temperature of about 57° F. for about 16 minutes. Of course, other methods of constructing the cards may be utilized.

Of course, other multilayer films may be utilized that incorporate an optical film therein (as described above) for blocking light of one or more ranges of electromagnetic radiation while allowing another range or ranges of electromagnetic radiation to be transmitted therethrough. The multilayer films may have any sequence of layers of any material and thickness to form individual transaction cards as herein defined.

Figure 7I:
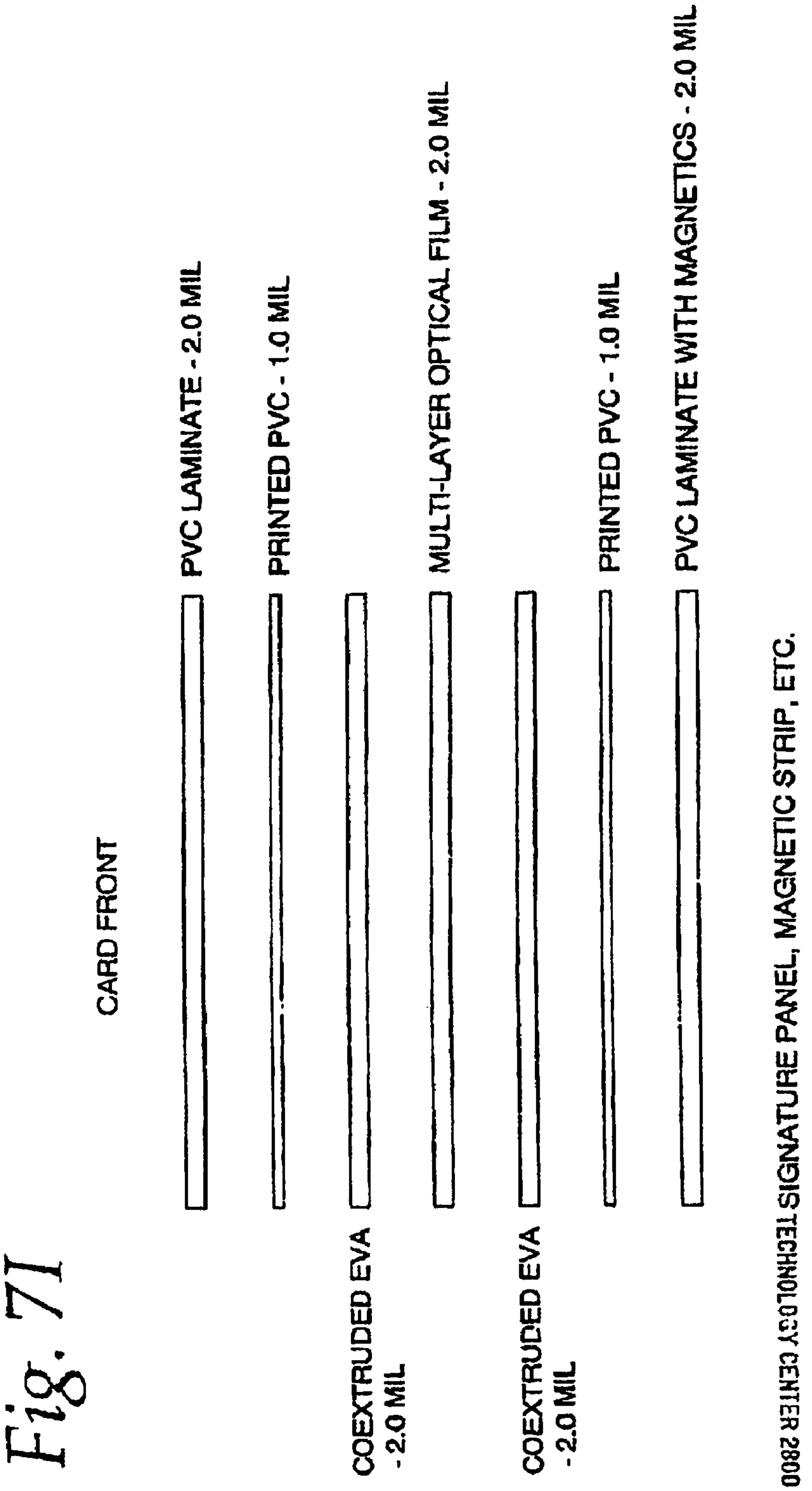
Figure 7J:
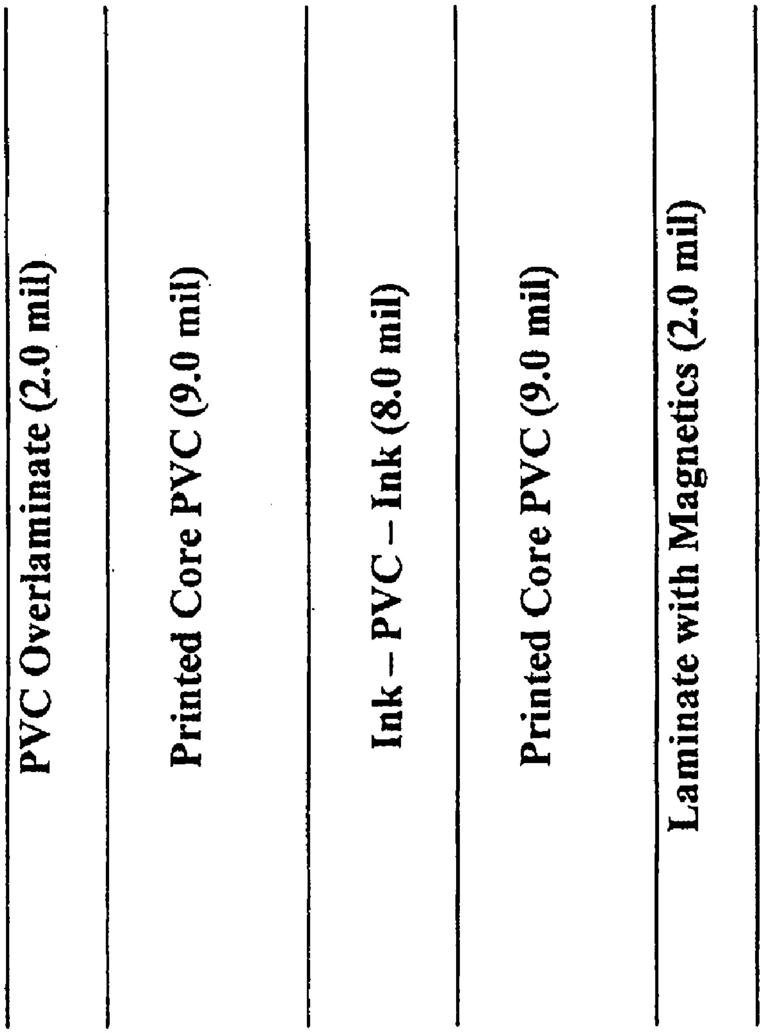

FIG. 7I illustrates another exemplary card sheet construction according to the present invention. Specifically, FIG. 7I illustrates another transparent or translucent card having an IR blocking optical film incorporated therein, as described above with reference to FIGS. 7A and 7G. The card sheet construction defined below may be made via a coextrusion/lamination process. Specifically, the card sheet comprises a layer of a PET IR blocking optical film (about 2.0 mils), as described above. An EVA-based material (about 2.0 mils) may be coextruded onto each side of the IR blocking film to form a 3-layer subassembly. The 3-layer subassembly may then be laminated on each side to a printed PVC layer (each about 11 mils). The card may further have PVC laminate layers (each about 2.0 mils) disposed on sides of the printed PVC layers thereby forming outside layers of the card.

Materials that may be utilized as the EVA-based material that is coextruded to the PET IR blocking film are acid modified EVA polymers. The acid modified EVA polymers may be Bynel® Series 1100 resins. Typically, the Bynel® Series 1100 resins are available in pellet form and are used in conventional extrusion and coextrusion equipment designed to process polyethylene resins. The Bynel® Series 1100 resins have a suggested maximum melting temperature of about 238° C. However, if adhesion results are inadequate, the melting temperature may be lowered. The remaining layers of the card may be laminated to the card as described above, or via any other lamination process to form a card.

In addition, FIG. 7H illustrates another exemplary card sheet construction according to the present invention. Specifically, FIG. 7H illustrates a transparent or translucent multilayer transaction card having an IR blocking ink incorporated therein. The IR blocking ink may be any ink having the characteristic of blocking IR radiation from being transmitted through the transaction card. Examples 1 and 2, noted above, describe two possible ink compositions that may be used. Of course, others may be used as well and the invention should not be limited as herein described.

The card sheet in FIG. 7H may comprise (from the card front to the card back) an outer layer of about 2.0 mil PVC laminate having the holographic foil, embossed surface, chip, and/or other indicia on its surface, about 13.0 mil printed PVC, about 2.0 mil PVC core, about 13.0 mil printed PVC, and an outer layer of about 2.0 mil PVC laminate comprising a signature panel, applied magnetic stripe and/or any other indicia apparent to one having ordinary skill in the art. It should be noted that the PVC core layer (herein described, according to FIG. 7H, as being about 2.0 mil thick) may be optional, and may be included if a thicker card is desired. Of course, the PVC core layer may be any thickness to create a transaction card having any thickness desired. These cards may be printed on the core PVC layer with IR blocking ink across the entire surface of the layer according to the printing methods described above with respect to Examples 1 and 2, above. Of course, any other method of printing or IR blocking ink may be utilized in the transaction card according to the present invention.

After the card sheets are laminated, according to the method described above or via any other method, the sheets are cut into individual cards by a known stamping process, including any necessary curing, burrowing, heating, cleaning, and/or sealing of the edges. Each individual transaction card is about 2.5"×3.0", and therefore conform to ISO standards for transaction card shape and size.

Figure 12A:
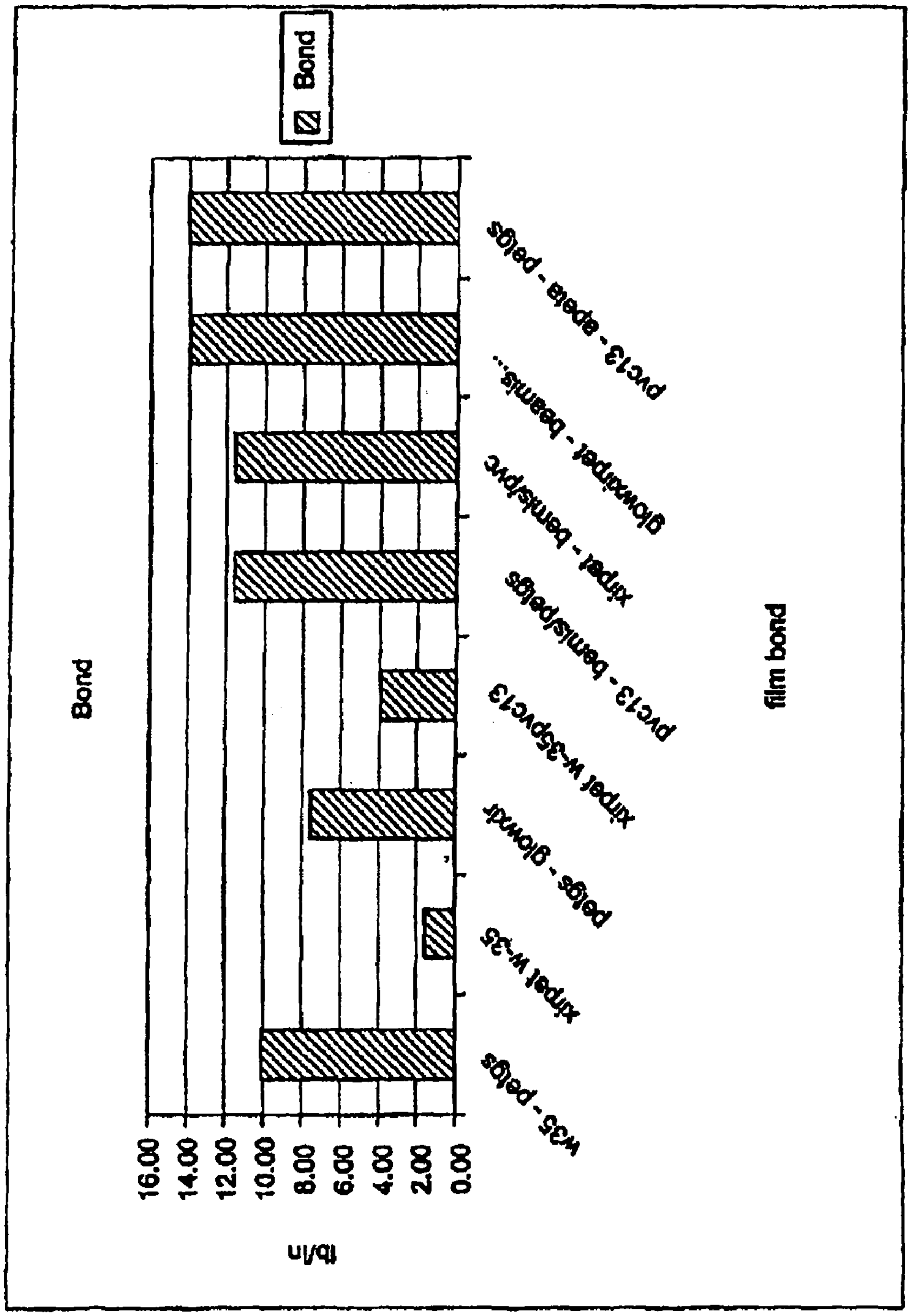
FIG. 12A shows exemplary film bond strengths on a graph of strength (lb/in) v. film bond for various film bonds in accordance with an exemplary embodiment of the present invention.
Figure 12B:
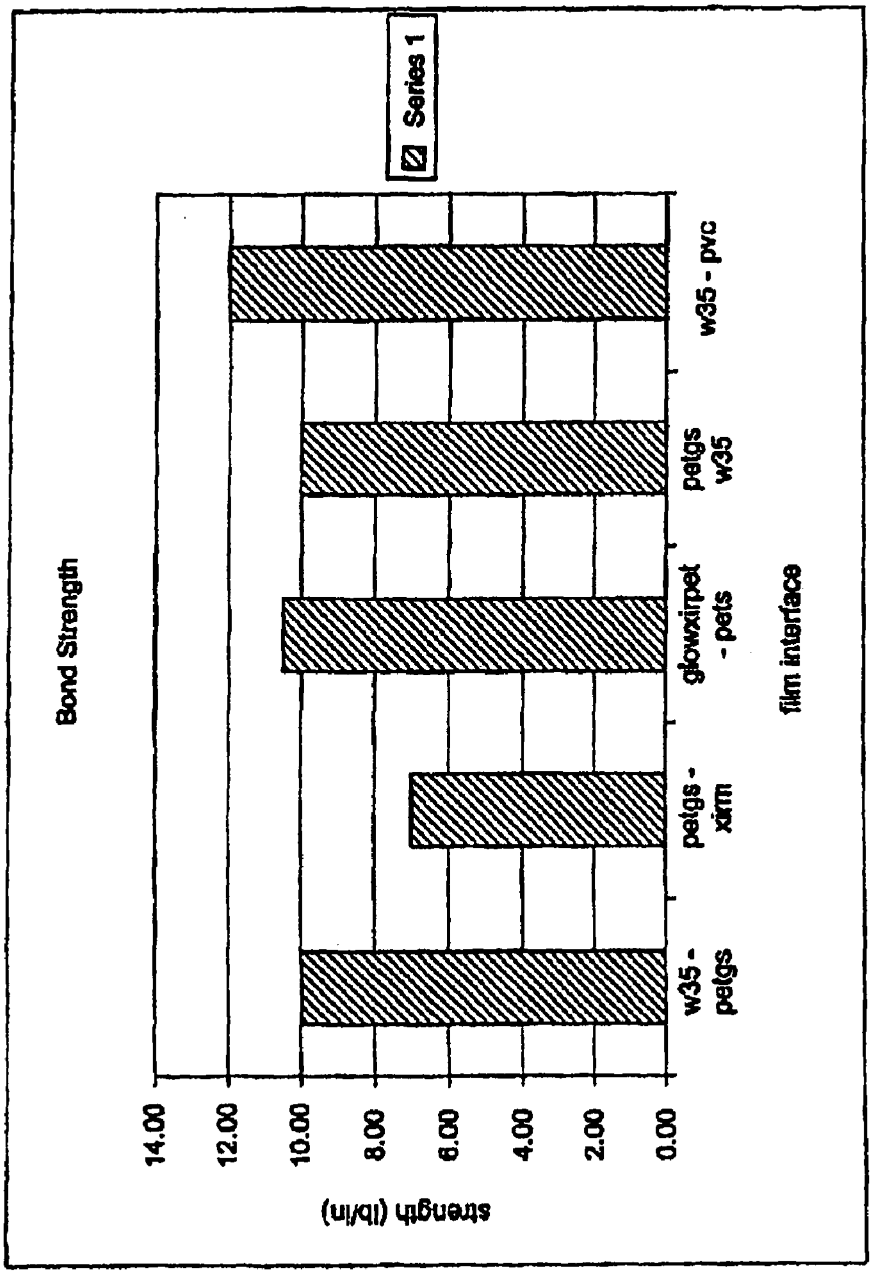
FIG. 12B shows exemplary bond strengths at the film interfaces on a graph of strength (lb/in) v. film interface for various film interfaces in accordance with an exemplary embodiment of the present invention.

Moreover, FIG. 11 details exemplary embodiments of layers/sheets for card construction, including layer number, material, layer thickness (in mil), source/manufacturer of the material, comments regarding bond strength data and total thickness (in mil). Additionally, with respect to FIG. 12A, the film bond strength is indicated on a graph of strength (lb/in) v. film bond for various film bonds. With respect to FIG. 12B, the bond strength at the film interfaces is indicated on a graph of strength (lb/in) v. film interface for various film interfaces.

After eventually combining the sheets (step 160), by adhering the front sheet 10 on top of the back sheet 12, the total thickness of the transaction card 5 is about 0.032 in. (32 mil.), which is within the ISO thickness standard for smart cards. Because the IC chip 20 is eventually embedded into the surface of the substrate (step 195), and the surface of chip 20 is co-extensive with the outer surface of the front sheet 10, the IC chip 20 does not affect the thickness of the overall card 5. Moreover, the about 3'×4' sheets include markings which define the boundaries of the individual cards 5 which will be cut from the sheet. Each exemplary sheet yields over 50 transaction cards (typically 56 cards), wherein each card 5 is within the ISO card size standard, namely about 2"×3.5".

Figure 10:
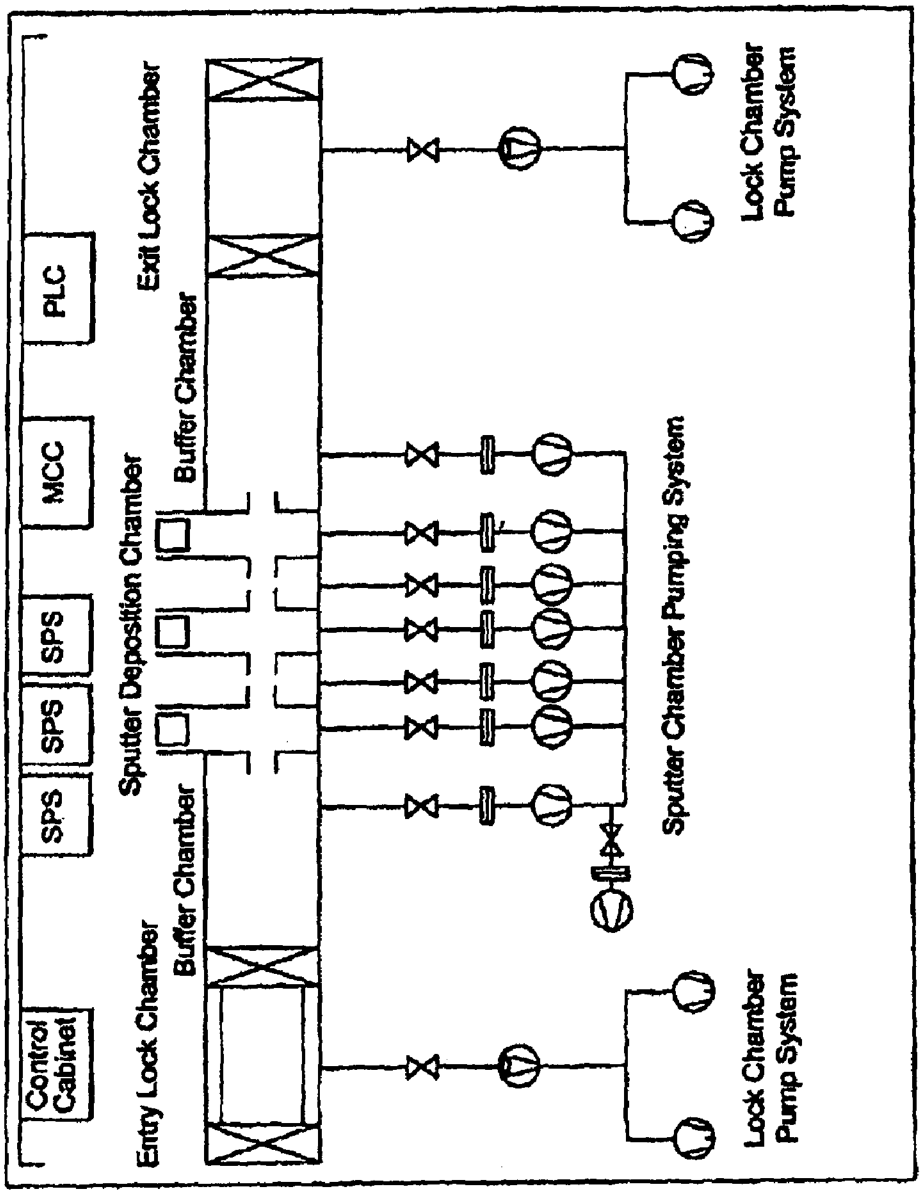
FIG. 10 shows an exemplary system for chemical vapor deposition of PET film in accordance with an exemplary embodiment of the present invention.

In general, an exemplary process for construction of card 5 having an IR film includes chemical vapor deposition of PET film which has optimal visible and infrared properties (step 105). The chemical deposition is preformed by a Magnetron Machine manufactured by the Magnetron Company. With respect to FIG. 10, the process incorporates a roll chemical vapor deposition sputtering system with three coating zones. The Magnetron roll vapor deposition machine deposits evaporation batches containing Ag, Au and Indium oxide onto optical grade polyethyleneterephthalate using chemical vapor deposition. The Ag/Au/Indium layers are about 100 angstroms each and, depending on the lower wavelength reflections, about three to five layers exist. More details related to vacuum coating, solar coating and Magnetron sputtering may be found in, for example, "Handbook of Optical Properties, Volume I, Thin Films for Optical Coatings" edited by Rolf Hummel and Karl H. Guenther, 1995, CRC Press, Inc, the entire contents of which is hereby incorporated by reference.

Figure 9:
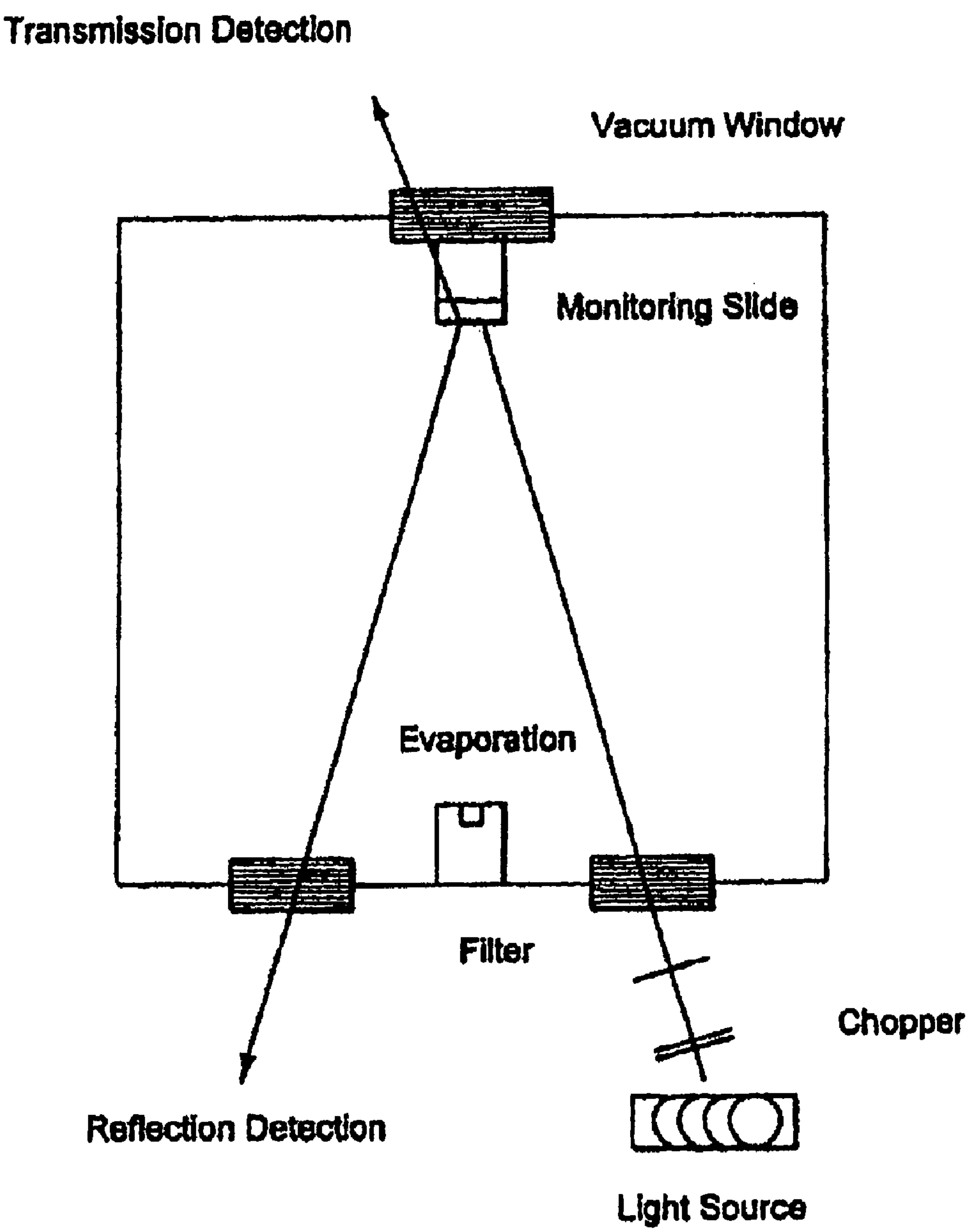
FIG. 9 is an exemplary reflection and transmission monitor with various optical components for vacuum evaporation in-line roll coating operations for monitoring the IR film in accordance with an exemplary embodiment of the present invention.

Next, plasma or flame treatment is applied to the PET film for surface tension reduction of the film (step 110). During the deposition and assembly of the layers, the IR film is monitored to optimize the IR blocking spectrum. Thus, the film is then tested against a standard by using a spectrophotometer to test the visible and infrared properties of the PET film (step 115). With respect to FIG. 9, a reflection and transmission monitor with various optical components for vacuum evaporation in-line roll coating operations is utilized to monitor the IR film. In-line spectrophotometric monitoring is part of the vapor deposition process. Transmission at various wavelengths is monitored during the entire run. A tack adhesive is applied to PET GS (polyethyleneterephthalate-gluable/stampable) (step 120) and a pressure laminate is applied to the Indium Oxide metal surface of the PET IR blocking film (step 125). Next, a tack adhesive is applied to the PET side of the IR blocking film (step 130) and a pressure laminate is applied to the PET GS (step 135). Exemplary lamination conditions include 280 F degrees and 600 psi for 22 minutes, then cooled under pressure for about 18 minutes. A heat seal adhesive is applied to both outer sides of the PET GS, or alternatively, a PVC adhesive is applied to both outer sides of the PET GS (step 140).

In an exemplary embodiment, certain compounds are printed over the surface of sheets 10 and 12. One skilled in the art will appreciate that the printing of the text 30, 32, 34, logos 50, infrared blocking ink and opacity gradient 25 may be applied to any surface of card 5 such as, for example, the front 10 face, the rear 12 face, the inside or outside surface of either face, between the two sheets of base material and/or a combination thereof. Moreover, any suitable printing, scoring, imprinting, marking or like method is within the scope of the present invention.

The opacity gradient 25 and infrared blocking ink are printed onto the sheets by a silk screen printing process (step 150). With respect to the opacity gradient 25, the exemplary gradient is comprised of a silver pearl ink gradation having an ink stippling which is more dense at the top of card 5 and gradually becomes less dense or clear as it approaches the bottom of card 5. One skilled in the art will appreciate that the opacity gradient 25 may be any density throughout the gradient 25 and the gradient 25 may traverse any direction across card 5 face. The opacity gradient 25 may be formed by any substance which may provide a similar gradient 25 on card 5. The exemplary ink gradient 25 for each card 5 is printed using known printing inks suitably configured for printing on plastic, such as Pantone colors. In an exemplary embodiment, the ink used for the stippling 25 is a silver pearl ink and is applied to the outside surface of each plastic sheet. Ink gradient 25 is printed on the surface of each of the sheets using a silk screen printing process which provides an opaque, heavier ink coverage or using offset printing process which provides halftone images in finer detail. The words "American Express" are printed in Pantone 8482 using a similar silkscreen process.

More particularly, with respect to silk screen printing, artwork containing the desired gradient 25 is duplicated many times to match the number of individual cards 5 to be produced from the sheets. The duplicated artwork is then suitably applied to a screen by any suitable known in the art photolithographic process and the screen is then developed. The screen is placed over the sheet and ink is suitably washed across the surface of the screen. The exposed portions of the screen allow the ink to pass through the screen and rest on the sheet in the artwork pattern. If multiple colors are desired, this process may be repeated for each color. Moreover, other security features are optionally silk printed on card 5 such as, for example, an invisible, ultraviolet charge card logo (visible in black light) is printed in a duotone of Pantone 307 and 297 using offset and silk screen presses.

The text 30, 32, 34 and logo 50 are printed on the outside surface of each sheet by a known printing process, such as an offset printing process (step 155) which provides a thinner ink coverage, but clearer text. More particularly, with respect to offset printing, the artwork is duplicated onto a metal plate and the metal plate is placed onto an offset press printing machine which may print up to four colors during a single run. The offset printed text includes, for example, a corporate name 30, a copyright notice 33, a batch code number 34, an "active thru" date 32, contact telephone numbers, legal statements (not shown) and/or the like. The exemplary offset text is printed in 4DBC in opaque white ink or a special mix of Pantone Cool Gray 11 called UV AMX Gray.

Because the resulting card 5 may be transparent, the text may be seen from both sides of card 5. As such, if the text is only printed on one sheet, the text may be obscured when viewing the text from the opposite side of card 5 (in other words, viewing the text "through" the plastic substrate). To minimize the obscuring of the text, the front sheet 10 is printed on its outside surface with standard format text and the back sheet 12 is printed on its outside surface with the same text, but the text is in "reverse" format. The back 12 text is aligned with the text on the front face 10, wherein the alignment of the text is aided by card 5 outline markings on the full sheet. Certain text or designs which may be obscured by an compound of card 5 (magnetic stripe 40, chip 20, etc.) may be printed on only one sheet. For example, in an exemplary embodiment, the corporate logo 50 is printed on only one sheet and is located behind the IC chip 20, thereby being hidden from the front 10 view and hiding at least a portion of the IC chip 20 from the back 12 view. One skilled in the art will appreciate that any of the offset printing may occur on the outside or inside surface of the sheets.

The sheet of laminate which is applied to the back 12 of card 5 (step 170) includes rows of magnetic stripes 40, wherein each magnetic stripe 40 corresponds to an individual card 5. The magnetic stripe 40 extends along the length of card 5 and is applied to the back 12 surface, top portion of card 5 in conformity with ISO standards for magnetic stripe 40 size and placement. However, the magnetic stripe 40 may be any width, length, shape, and placed on any location on card 5. The two track magnetic stripe 40, including the recorded information, may be obtained from, for example, Dai Nippon, 1-1, Ichigaya Kagacho 1-chome, Shinjuku-ku, Tokyo 162-8001, Japan, Tel: Tokyo 03-3266-2111. In an exemplary embodiment, the magnetic stripe is applied to the outer laminate using a tape layer machine which bonds the cold peel magnetic stripe to the outer laminate roll with a rolling hot die and at suitable pressure. The roll is then cut into sheets at the output of the tape layer before the card layers are assembled and the stripe is fused to the card during the lamination process.

Although prior art magnetic stripes 40 in current use are black, in a particularly exemplary embodiment, the magnetic stripe 40 of the present invention is a silver magnetic stripe 40. Exemplary silver magnetic stripe 40 is 2750 oersted and also conforms to ISO standards. Moreover, the silver magnetic stripe 40 includes printing over the magnetic stripe 40. The printing on the magnetic stripe 40 may include any suitable text, logo 50, hologram foil 15 and/or the like; however, in an exemplary embodiment, the printing includes text indicative of an Internet web site address. Dai Nippon Printing Co., Ltd (more information about Dai Nippon may be found at www.dnp.co.jp) prints a hologram or text on the magnetic stripe using, for example, the Dai Nippon CPX10000 card printer which utilizes dye sublimation retransfer technology having a thermal head which does not contact the card surface. The card printer utilizes the double transfer technology to print the image with the thermal head over a clear film and then re-transferring the printed image onto the actual card media by heat roller. The printing of information on the surface of the magnetic stripe 40 is preformed by, for example, American Banknote Holographics, 399 Executive Blvd., Elmsford, N.Y. 10523, (914) 592-2355. More information regarding the printing on the surface of a magnetic stripe 40 may be found in, for example, U.S. Pat. No. 4,684,795 issued on Aug. 4, 1987 to United States Banknote Company of New York, the entire contents of which is herein incorporated by reference.

After the desired printing is complete and the magnetic stripe applied, the front 10 and back 12 sheets are placed together (step 160), and the sheets are adhered together by any suitable adhering process, such as a suitable adhesive. One skilled in the art will appreciate that, instead of printing on two sheets and combining the two sheets, a single plastic card 5 may be used, wherein card 5 is printed on one side, then the same card 5 is re-sent through the printer for printing on the opposite side. In the present invention, after adhering the sheets together, a sheet of lamination, approximately the same dimensions as the plastic sheets, namely 3'×4', is applied over the front 10 and back 12 of card 5. After the laminate is applied over the front 10 and back 12 of the combined plastic sheets (step 170), card 5 layers are suitably compressed at a suitable pressure and heated at about 300 degrees, at a pressure of between 90-700 psi, with a suitable dwell time to create a single card 5 device. The aforementioned card fabrication may be completed by, for example, Oberthur Card Systems, 15 James Hance Court, Exton, Pa.

The cards may be constructed by laminating the layers together using heat and pressure. For example, the transaction cards may be roll laminated with adhesives, platen laminated, or other lamination process to laminate the cards together. Processing temperatures may range from about 200° F. to about 500° depending on the material used in the layers of the multilayer transaction card (such as PETG, polycarbonate, or other like materials). For PVC, the temperatures commonly range from about 270° F. to about 320° F. Pressures may range from about 50 psi to about 600 psi. Processing times for laminating the transaction cards of the present invention may range from a few seconds (1-10 seconds, for example if roll laminated with adhesives) to up to about an hour if polycarbonate is used as a material in the multilayer transaction card. For PVC materials, a hot cycle of about 20 to 30 minutes may be used. Cool cycles may last about 15 to about 25 minutes for PVC materials.

In an exemplary embodiment, and especially for IR ink cards, such as, for example, the card described with respect to FIG. 7H, the card layers are fused together in a lamination process using heat and pressure. During the hot press phase, the press is heated to about 300 F degrees and the pressure builds to about 1000 psi and holds for about 90 seconds. The pressure then ramps up to about 350 psi over an about 30 second period and holds for 16 minutes at the same temperature, namely 300 F degrees. The card is then transferred to a cold press that is at about 57 F degrees. The pressure builds to about 400 psi and is held for about 16 minutes as chilled water of about 57 F degrees is circulated in the plates. The cold press then unloads the card.

With respect to FIGS. 1 and 2, after the laminate is applied, a signature field is applied to the back surface 12 of card 5 (step 175) and the holographic foil 15 is applied to the front 10 of card 5 (step 190). With respect to signature field 45, although prior art signature fields are formed from adhering a paper-like tape to the back 12 of card 5, in an exemplary embodiment of the present invention, the signature field 45 is a translucent box measuring about 2" by ⅜" and is applied to the card using a hot-stamp process. The verification of the signature in signature field 45 by the merchant is often a card 5 issuer requirement for a merchant to avoid financial liability for fraudulent use of card 5. As such, the translucent signature field 45 on the transparent card 5 not only allows the clerk to view at least a portion of the signature field 45 from the front of the card 5, but the signature view also encourages the clerk to turn over card 5 and verify the authenticity of the signature with the signed receipt.

After the card sheets are laminated, the sheets may be cut into individual cards 5 (step 180) by a known stamping process, including any necessary curing, burrowing, heating, cleaning and/or sealing of the edges. The individual transaction cards 5 may be about 3"×4" and conform to ISO standards for transaction card 5 shape and size. In an exemplary embodiment, the laminated sheets of 56 cards may be suitably cut in half on a guillotine device, resulting in two half-sheets of 28 cards. The half-sheets may be loaded onto a card punch machine which aligns the sheets to a die (x and y axes) using predetermined alignment marks visible to the optics of the machine. The half-sheets may be then be fed under the punch in seven steps. Particularly, a fixed distance feed may be followed by another optic sensor search to stop the feed at the pre-printed alignment mark, then the machine punches a row of four cards out at one time. After die culling and finishing according to standard processing, the IR reflection properties may be verified in-line (step 185) before application of the holographic foil 15.

With respect to the application of an exemplary holographic foil, the holographic foil 15 is adhered to card 5 (step 190) by any suitable method. In an exemplary embodiment, a substantially square steel die, which is about 1¼"×1¼" with rounded corners and a 0.0007" crown across the contacting surface, stamps out the individual foils 15 from a large sheet of holographic foil 15. The die is part of a hot stamp machine such that the die is sent through a sheet of foil 15, cutting the foil 15 around a particular image and immediately applying the foil 15 with heat to the front 10 surface of card 5 after the card has been laminated. The die temperature may be in the range of about 300 F.°+/−10 F.°. The dwell time is approximately ½ seconds and the application speed is set based upon the individual hot stamp applicator; however, the foregoing temperature and dwell is identified for a speed of 100 cards per minute. U.S. Pat. Nos. 4,206,965; 4,421,380; 4,589,686; and 4,717,221 by Stephen P. McGrew provide more details about hot stamping of a holographic image and are hereby incorporated by reference.

With respect to the holographic foil 15, the foil 15 may be any color, contain any hologram, may be applied to any location on card 5, and may be cut to any size, shape and thickness. In an exemplary embodiment, the holographic foil 15 sheet includes a gray adhesive on the bottom side and a blue, mirror-like, three-dimensional holographic surface on the top side containing numerous holographic images about 1¼"×1¼" each. The exemplary hologram includes a 360 degree viewability and diffracts a rainbow of colors under white light. The full color hologram is created by, for example, American Banknote Holographics.

The corners of the individual foil 15 may be rounded to minimize the likelihood that the foil 15 will peal away from the surface of card 5. Moreover, when applied to the card, the blue holographic surface faces away from card 5 while the gray adhesive side is applied to card 5 surface. The top surface of the holographic foil 15 may be created by any suitable method such as reflection holographics, transmission holographics, chemical washing, the incorporation of mirror compounds and/or any combination thereof. The holographic foil 15 may be fabricated by, for example, American Banknote Holographics, Inc. located at 1448 County Line Road, Huntingdon Valley, Pa., 19006.

The exemplary holographic foil includes various layers. One skilled in the art will appreciate that any ordering, combination and/or composition of these layers which provides a similar holographic effect is still within the scope of the present invention. In an exemplary embodiment, the holographic transfer foil structure includes the following layers: 90 gauge polyester carrier, release coat, embossable resin, vacuum deposited aluminum, tie coat and size coat. During the transfer process, the embossable resin, vacuum deposited aluminum, tie coat and size coat layers are deposited onto a substrate.

In an exemplary embodiment, the sheets of holographic foil 15 are transmission holograms suitably created by interfering two or more beams of converging light, namely an object beam and reference beam, from a 20 watt Argon laser at 457.9 nm, onto a positive photoemulsion (spun coat plates using shiply photoresist). The system records the interference pattern produced by the interfering beams of light using, for example, a 303A developer. The object beam is a coherent beam reflected from, or transmitted through, the object to be recorded which may be a three-dimensional mirror. The reference beam may be a coherent, collimated light beam with a spherical wave front 10.

The incorporation of the holographic foil 15 onto a transaction card 5 provides a more reliable method of determining the authenticity of the transaction card 5 in ordinary white light, namely by observing if the hologram has the illusion of depth and changing colors. Thus, to allow the hologram to be viewed with ordinary, white light, when the hologram is recorded onto the transaction card 5, the image to be recorded is placed near the surface of the substrate. Moreover, the hologram is be embossed on a metalized carrier, such as the holographic foil 15, or alternatively the hologram may be cast directly onto the transparent plastic material. When formed on the clear plastic material, the hologram is made visible by the deposit of a visible substance over the embossed hologram, such as a metal or ink. More information regarding the production of holograms on charge cards 5 or the production of holographic foil 15 may be found in, for example, U.S. Pat. No. 4,684,795 issued on Aug. 4, 1987 to United States Banknote Company of New York or from the American Banknote Holographics, Inc. web site at www.abnh.com, both of which are herein incorporated by reference.

In an exemplary embodiment, the application of holographic foil onto vinyl credit cards is accomplished by using a metallized credit card foil. The foil is un-sized, metallized, embossable, abrasion, and chemical resistant hot stamping foil on a 1.0 mil (92 gauge) polyester carrier. All of the exemplary materials are tinted with raw materials supplier color code #563 (blue). The foil is vacuum metallized with aluminum and has an optical density range of about 1.60 to 2.00. The optimum foil is free of visible defects and particulate matter. The foil contains release characteristics of about 0 to 7 grams based upon a release testing unit having a die face of 300 F degrees, 80 psi, 1.0 seconds dwell, 0.1 seconds delay in the removal of the carrier at a 45 degree angle. An exemplary base material is capable of receiving a permanent, high fidelity (based upon an embossing die of 100%, having at least 70% diffraction efficiency) impression of the holographic image surface by embossing with a hard nickel die in the range of about 1600 pounds per linear inch at about 100 pounds air pressure and in the range of about 200 to 350 F degrees die temperatures. When testing the embossibility of the base material, the testing includes a primary and secondary image to assure the embossable coating is capable of producing an optimal secondary image.

With respect to the mechanical and chemical durability of the holographic foil, the foil resists abrasions. As such, after sizing and stamping the foil onto the vinyl credit card, the transferred hologram withstands about 100 cycles on the Taber Abrader using CS-10 wheels and about a 500 gram load before signs of breakthrough. The foil resists scuffing such that the foil withstands about 6 cycles on Taber Abrader under the same conditions without any substantial visual marks, scratches or haze. The holographic foil also resists any substantial evidence of cracking the vinyl in the hologram area when embossed on a DC 50000 encoder or an equivalent system. Moreover, the embossed, un-sized foil on the polyester carrier is capable of being stretched 15% without cracking of the base coat. Moreover, the exemplary vinyl card with the exemplary hologram withstands 15 minutes in an oven at 110 C.° with the image clearly visible after the test. Additionally, the exemplary hologram does not show any visible effects after 5 cycles of 8 hours at 0° and 16 hours at 60 C.°.

The exemplary holograms on the vinyl cards also resist plasticizers, alkalis, acids and solvents. In particular, the cards with holograms withstand immersion in warm liquid plasticizers (typically dioctyl phthalate) up to the point of severe swelling of the card. The image on the card is not substantially affected by contact with plasticized vinyl for a period of 5 days at 60 C.°. With respect to alkalis, the holograms on the cards withstand approximately 1 hour immersion in 10% ammonium hydroxide at room temperature without deterioration. Moreover, the hologram does not show substantial deterioration after 50 hours of immersion at room temperature in artificial alkaline perspiration (10% sodium chloride, 1% sodium phosphate, 4% ammonium carbonate, and pH 8.0). With respect to acids, the exemplary holograms on the cards substantially withstand approximately 1 hour immersion in 10% acetic acid at room temperature without substantial deterioration. Moreover, the exemplary hologram substantially withstand, without substantial deterioration, 50 hours immersion at room temperature in artificial acetic perspiration (10% sodium chloride, 1% sodium phosphate, 1% lactic acid, pH 3.5).

With respect to solvents, the exemplary holograms on cards substantially withstand the following: ethylene glycol (100% and 50% in water) with no substantial effects after 4 hours at room temperature, ethyl alcohol (100% and 50% in water) with no substantial effect after 4 hours at room temperature, methyl ethyl ketone has no substantial effect after 1 minute at room temperature, toluene has no substantial effect up to severe swelling of the card (30 minutes at room temperature), water has no substantial effect after 16 hours at 60 C.° and concentrated laundry detergent has no substantial effect after 20 hours at room temperature.

Moreover, the exemplary holograms on the vinyl cards do not show substantial effects after being washed and dried in a commercial washer and dryer inside a pants pocket at permanent press settings.

The charge card substrate is comprised of a vinyl base or other comparable type material which is suitably capable of accepting a hot stamping of a hologram without substantially violating the present composition of the hologram or its coatings. When adhering the hologram to the vinyl card, the coating exhibits a consistent blush and is uniform in color, viscosity and free of contamination. The adhesion of the hologram to the card is also sufficiently strong enough such that the application of Scotch 610 tape over the hologram which is removed at a 45° angle will not result in a significant amount of foil removed from the substrate.

With respect to the brightness of the image, a diffraction reading is obtained at a minimum of about 2 microwatts on the registration blocks. Moreover, with respect to image quality, the images are substantially free of defects such as large spots, scratches, wrinkles, mottle, haze, and/or any other defects that substantially distort the image.

The final exemplary product is slit at a width of 1 53/64"+/−1/64" and length of 10,000 images per roll. The registration block is located no more than about 5/64" from the edge of the slit material. All finished rolls are wound with the metal side facing in on a 3.0" ID core with a maximum of 3 splices permitted per finished reel and the registration blocks are 0.125"×0.125" square.

After stamping out the individual cards 5 and applying the holographic foil, the IC chip 20 is applied to card 5 (step 195) by any suitable method, such as adhesive, heat, tape, groove and/or the like. More particularly, a small portion of the front 10 of card 5 is machined out using, for example, a milling process. The milling step removes about 0.02 mils of plastic from the front 10 surface, such that the routed hole cuts into the two core layers of plastic, but does not go through the last outer laminate layer of plastic, thereby forming a 5235HST pocket. IC chip 20 is a 5235 palladium plated with silver, rather than the standard gold plating. IC chip 20 is applied to the card using a process known as "potting". Any suitable adhesive, such as a non-conductive adhesive, is placed into the machined hole and the IC chip 20 is placed over the adhesive such that the top surface of the IC chip 20 is substantially even with the front 10 surface of card 5. Suitable pressure and heat is applied to the IC chip 20 to ensure that the IC chip 20 is sufficiently affixed to card 5. The IC chip 20 is any suitable integrated circuit located anywhere on card 5. In an exemplary embodiment, the IC chip 20 structure, design, function and placement conforms to ISO standards for IC chips 20 and smart cards 5. The IC chip 20 may be obtained from, for example, Siemens of Germany.

After applying the holographic foil 15 and the IC chip 20 to card 5, certain information, such as account number 35 and "active thru" 32 date (not shown), may be embossed into card 5 (step 200) by known embossing methods. The embossing may be completed by, for example, Oberthur Card Systems. Although any information may be embossed anywhere on card 5, in a particularly exemplary embodiment, the account numbers 35 are embossed through the holographic foil 15 to reduce the possibility of the transfer of the holographic foil 15 to a counterfeit card 5 for fraudulent use. Additionally, although prior art cards 5 include a beginning and ending validity date, the present card 5 only includes an "active thru" 32 date, namely a date in which the card expires.

While the foregoing describes an exemplary embodiment for the fabrication of card 5, one skilled in the art will appreciate that any suitable method for incorporating text 30, 32, 34, logos 50, embossed numbers 35, a magnetic stripe 42, a signature field 45, holographic foil 15, an IC chip 20 and opacity gradient 25 (see FIGS. 1 and 2) onto a substrate is within the scope of the present invention. Particularly, the holographic foil 15, IC chip 20, logo 50, magnetic stripe 40, signature field 45 or any other compound may be affixed to any portion of card 5 by any suitable means such as, for example, heat, pressure, adhesive, grooved and/or any combination thereof.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. The present invention has been described above with reference to an exemplary embodiment. However, those skilled in the art having read this disclosure will recognize that changes and modifications may be made to the exemplary embodiment without departing from the scope of the present invention. For example, various steps of the invention may be eliminated without altering the effectiveness of the invention. Moreover, other types of card fabrication, encoding and printing methods may be used such as dye sublimation retransfer technology and/or double transfer technology developed by Dai Nippon Printing Company of Japan. These and other changes or modifications are intended to be included within the scope of the present invention, as expressed in the following claims.

The invention claimed is:

1. A card having a portion comprising:

a layer that is at least one of translucent and transparent; and a first infrared blocking compound associated with said layer, wherein said first infrared blocking compound comprises a quantum dot compound.

2. The card of claim 1, further comprising a second infrared blocking compound associated with said layer.

3. The card of claim 2, wherein said second infrared blocking compound is incorporated into said layer.

4. The card of claim 1, wherein said infrared blocking compound blocks infrared radiation above about 1200 nm.

5. The card of claim 1, wherein said infrared blocking compound blocks infrared radiation from between about 1300 nm to about 2500 nm.

6. The card of claim 1, wherein an ink comprises said quantum dot compound.

7. The card of claim 6, wherein said ink is selected from the group consisting of Au, Ag, and Indium Oxide.

8. The card of claim 1, further comprising a third infrared blocking compound comprises an infrared blocking film comprising a plurality of layers disposed on a substrate, said plurality of layers comprising at least two layers having different refractive indices.

9. The card of claim 1, wherein a third infrared blocking compound comprises at least one of an isotropic dielectric multilayer film and a birefringent dielectric multilayer film.

10. The card of claim 1, wherein said layer has a first surface and a second surface, wherein said first infrared blocking material is a first ink that is printed onto said first surface and a second infrared blocking compound is a second ink that is printed onto said second surface.

11. The card of claim 1, wherein said layer has a first surface and a second surface, wherein said first infrared blocking compound is disposed on said first surface and a second infrared blocking compound is disposed on said second surface.

12. The card of claim 1, wherein said layer has a first surface and a second surface, wherein said first infrared blocking compound is disposed on at least one of said first surface and a second infrared blocking compound is disposed on said second surface.

13. The card of claim 1, wherein said first infrared blocking compound substantially covers at least one of said first surface and said second surface of said layer.

14. The card of claim 1, wherein said first infrared blocking compound is a first ink that is printed onto said layer and said second infrared blocking compound is a second ink that is printed onto said layer.

15. The card of claim 1, wherein said layer is comprised of at least one of glass and a polymeric material.

16. An article having a portion comprising:

at least one of a translucent and transparent surface;

a first infrared blocking compound capable of blocking infrared light in a first wavelength range, said first infrared blocking compound associated with at least one of said surface and a second infrared blocking compound; and said second infrared hocking compound capable of blocking infrared light in a second wavelength range, said second infrared blocking compound associated with at least one of said surface and said first infrared blocking compound, wherein said second infrared blocking compound comprises a quantum dot compound.

* * * * *

UNITED STATES PATENT AND TRADEMARK OFFICE

CERTIFICATE OF CORRECTION

PATENT NO. : 8,186,598 B2
APPLICATION NO. : 13/244193
DATED : May 29, 2012
INVENTOR(S) : William J. Faenza, Jr.

It is certified that error appears in the above-identified patent and that said Letters Patent is hereby corrected as shown below:

In the Claims:

In column 32, line 53 (claim 16), please delete “infrared hocking compound” and insert --infrared blocking compound--.

Signed and Sealed this
Fifth Day of August, 2014

Michelle K. Lee

Michelle K. Lee
*Deputy Director of the United States Patent and Trademark Office*